US008719329B2

(12) United States Patent
Imai et al.

(10) Patent No.: US 8,719,329 B2
(45) Date of Patent: May 6, 2014

(54) IMAGING DEVICE, IMAGING SYSTEM, IMAGE MANAGEMENT SERVER, IMAGE COMMUNICATION SYSTEM, IMAGING METHOD, AND IMAGE MANAGEMENT METHOD

(75) Inventors: Yuji Imai, Hachioji (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 94 days.

(21) Appl. No.: 13/073,580

(22) Filed: Mar. 28, 2011

(65) Prior Publication Data
US 2011/0238725 A1    Sep. 29, 2011

(30) Foreign Application Priority Data
Mar. 29, 2010    (JP) ................ 2010-076057

(51) Int. Cl.
G06F 15/16    (2006.01)
H04L 29/08    (2006.01)
H04L 29/06    (2006.01)

(52) U.S. Cl.
CPC ........... *H04L 29/08072* (2013.01); *H04L 29/06* (2013.01); *H04L 29/08135* (2013.01); *H04L 29/08144* (2013.01); *H04L 29/0809* (2013.01)
USPC .......................................... 709/201; 709/202

(58) Field of Classification Search
CPC .............. H04L 29/08072; H04L 29/06; H04L 29/08135; H04L 29/08144; H04L 29/0809
USPC ................................................. 709/201, 202
See application file for complete search history.

(56) References Cited

U.S. PATENT DOCUMENTS

| 8,032,616 | B2* | 10/2011 | Min .............................. 709/220 |
| 2003/0014430 | A1* | 1/2003 | Yoo ............................... 707/200 |
| 2006/0047704 | A1* | 3/2006 | Gopalakrishnan .......... 707/104.1 |
| 2006/0294094 | A1* | 12/2006 | King et al. ........................ 707/6 |
| 2007/0133064 | A1* | 6/2007 | Itogawa et al. ............... 358/403 |
| 2007/0266252 | A1* | 11/2007 | Davis et al. ................... 713/176 |

FOREIGN PATENT DOCUMENTS

| JP | 2000-298605 | 10/2000 |
| JP | 2001-075846 | 3/2001 |
| JP | 2004-342192 | 12/2004 |
| JP | 2008-276706 | 11/2008 |
| JP | 2009-230650 | 10/2009 |

OTHER PUBLICATIONS

Office Action corresponding to Japanese Patent Application No. 2010-076057 mailed on Dec. 17, 2013 (2 pgs.) with translation (3 pgs.).

* cited by examiner

*Primary Examiner* — Hassan Phillips
*Assistant Examiner* — Siren Wei
(74) *Attorney, Agent, or Firm* — John C. Pokotylo; Straub & Pokotylo

(57) ABSTRACT

An imaging device includes an imaging unit that images a subject to generate electronic image data; and a communication unit that communicates with a plurality of servers through a network. The imaging device also includes an image file generating unit that generates an image file including first interpretation subject information interpreted by any one of the plurality of servers.

5 Claims, 22 Drawing Sheets

```
                                                    F2
  WEBLOG TITLE: COOKING WEBLOG
  USER ID: OOOOO
  IMAGING DEVICE ID: OOOOOOOO
  IP ADDRESS: OOO.OOO.OO.OO
  CLASSIFICATION:  1.SPAGHETTI
        KEYWORD    2.CURRY AND RICE
                   3.CROQUETTE

PLEASE ENTER
CLASSIFICATION KEYWORD

1. SPAGHETTI
2. CURRY AND RICE
3. CROQUETTE

COOKING WEBLOG

CURRY AND RICE

2/20          2/27

◁   [image]   [image]   ▷

→ TO SPAGHETTI
→ TO CROQUETTE

FIG.15
(a) 
(b) 

F4
- TAG — F41
- INTERPRETATION SUBJECT INFORMATION — F42
  - REFERENCE SERVER ADDRESS INFORMATION — F421
  - UNENCRYPTED METADATA GROUP — F422
  - ENCRYPTED METADATA GROUP — F423
- IMAGE DATA — F43

D1

| DATA CLASSIFICATION | START ADDRESS | DATA LENGTH (BYTE) |
|---|---|---|
| TEMPERATURE DATA | ·····0001 | 1 |
| DIRECTION DATA | ·····0000 | 1 |
| EVENT DATA | ·····0010 | 1 |
| ⋮ | ⋮ | ⋮ |

FIG.19

| BIT | CONTENTS |
|---|---|
| 0 (LSB) | TEMPERATURE |
| 1 | TEMPERATURE |
| 2 | TEMPERATURE |
| 3 | TEMPERATURE |
| 4 | TEMPERATURE |
| 5 | TEMPERATURE |
| 6 | TEMPERATURE |
| 7 (MSB) | SIGN |

FIG.20

| DATA | CONTENT |
|---|---|
| 00000001 | EAST |
| 00000010 | EAST-SOUTHEAST |
| 00000011 | SOUTHEAST |
| 00000101 | SOUTH-SOUTHEAST |
| ⋮ | ⋮ |

FIG.21

| DATA | CONTENT |
|---|---|
| 00000001 | SPORTS DAY |
| 00000010 | PICNIC |
| 00000011 | DATA |
| 00000101 | TRIP |
| 00000110 | BUSINESS |
| ⋮ | ⋮ |

FIG.22

| DATA CLASSIFICATION | START ADDRESS | DATA LENGTH (BYTE) |
|---|---|---|
| PERSON NO. 1 | ·····0001 | 16 |
| PERSON NO. 2 | ·····0000 | 16 |
| MESSAGE | ·····0010 | 64 |
| ⋮ | ⋮ | ⋮ |

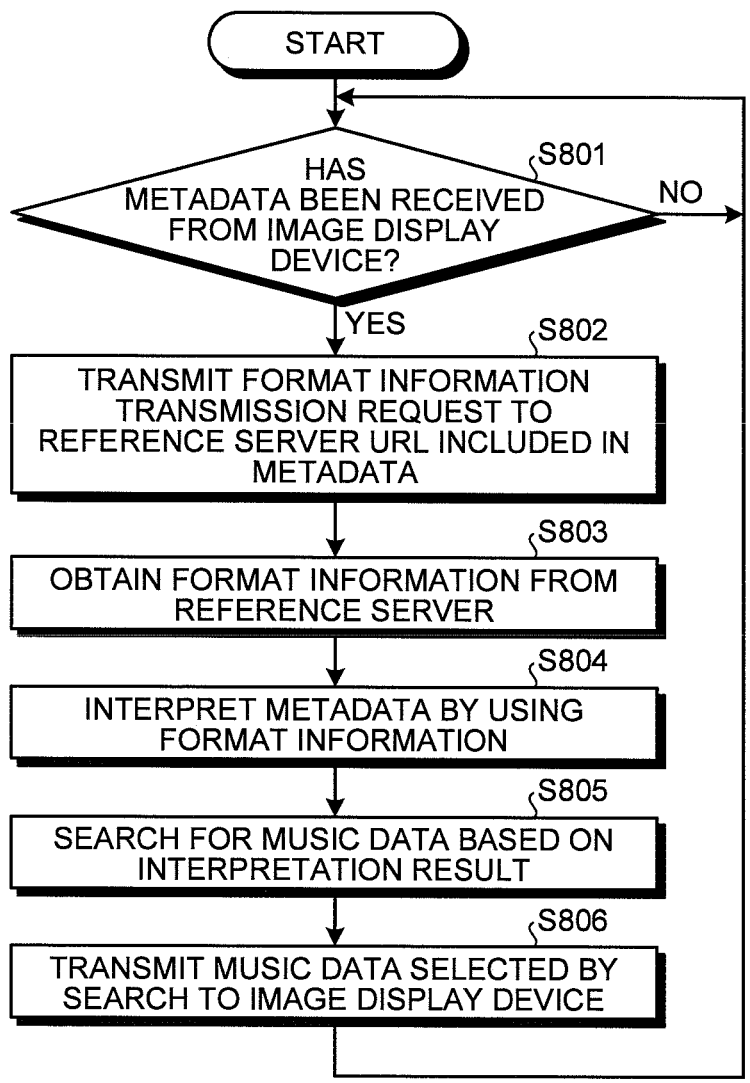

… # IMAGING DEVICE, IMAGING SYSTEM, IMAGE MANAGEMENT SERVER, IMAGE COMMUNICATION SYSTEM, IMAGING METHOD, AND IMAGE MANAGEMENT METHOD

CROSS-REFERENCE TO RELATED APPLICATION

This application is based upon and claims the benefit of priority from Japanese Patent Application No. 2010-076057, filed on Mar. 29, 2010, the entire contents of which are incorporated herein by reference.

BACKGROUND OF THE INVENTION

1. Field of the Invention

The present invention relates to an imaging device imaging a subject and generating image data, an image management server managing an image file containing image data, an image communication system for communicating an image file, and an image management method of managing an image file.

2. Description of the Related Art

Conventionally, there are known various technologies of adding metadata such as capturing date and time to image data generated by an imaging device such as a digital camera, thereby enabling, for example, keyword search and the like to manage images. Recently, there are many ways of using image data, like that it is watched through an electronic device such as a television, a personal computer, a digital photo frame, and the like; it is attached to a mail; and it is stored, displayed, or the like through the Internet. As for a format of an image file taken by a digital camera, there is known an exchangeable image file format (EXIF). In the EXIF, metadata such as a manufacturer's name, the model of the device, capturing date and time, a stop, and a shutter speed are recorded by using a tag of a tagged image file format (TIFF). In the digital camera, metadata is automatically generated on the basis of the EXIF when an image file is stored.

Under these circumstances, there is known a technology of recording image data as content with metadata associated with the content and performing various processes by using the metadata.

For example, in a technology disclosed in the following Japanese Patent Application Laid-open Patent Publication No. 2008-276706, virtual management information for virtually managing a content is generated. A file entry, which is a hierarchical entry including the generated virtual management information and organized in a virtual hierarchical structure, is recorded, and at the same time, a metadata entry, which is a hierarchical entry including metadata associated with the content, is recorded at a lower hierarchical level than the file entry. Desired metadata is extracted from the metadata included in the metadata entry, and at the same time, a content file recorded at a higher hierarchical level than the metadata entry including the extracted metadata is extracted. Therefore, it is possible to quickly use the content.

SUMMARY OF THE INVENTION

An imaging device according to an aspect of the present invention includes an imaging unit that images a subject to generate electronic image data; a communication unit that communicates with a plurality of servers through a network, and an image file generating unit that generates an image file including first interpretation subject information interpreted by any one of the plurality of servers.

An imaging device according to another aspect of the present invention includes an imaging unit that images a subject to generate electronic image data; an image file generating unit that generates an image file including first interpretation subject information and second interpretation subject information, the first interpretation subject information being interpreted by any one of a plurality of servers connected to each other through a network, the second interpretation subject information including address information for access to any one of the plurality of servers through the network; and an access control unit that transmits the image file to the server with the address information based on the second interpretation subject information.

An imaging system according to still another aspect of the present invention includes an imaging unit that images a subject to generate electronic image data; and an image file generating unit that generates an image file including first interpretation subject information interpreted by any one of a plurality of servers in a network and second interpretation subject for access to any one of the plurality of servers through the network.

An image management server according to still another aspect of the present invention includes a storing unit that stores an image file including interpretation subject information, the interpretation subject information including address information of a reference server, the reference server storing format information for defining at least one of a format of electronic image data and a format of metadata associated with the image data; a communication unit that transmits a transmission request for the format information to the reference server through a network and receives the format information from the reference server responding to the transmission request; an interpreting unit that interprets the interpretation subject information included in the image file based on the format information received by the communication unit; and a database generating unit that generates a database of the interpretation subject information interpreted by the interpreting unit.

An image communication system according to still another aspect of the present invention includes an imaging device that images a subject to generate electronic image data; and a plurality of servers capable of communicating with the imaging device through a network. The imaging device includes an image file generating unit that generates an image file including interpretation subject information interpreted by any one of the plurality of servers, the interpretation subject information including at least one of the generated image data and a plurality of pieces of metadata associated with the image data, the interpretation subject information including address information of a server capable of interpreting the interpretation subject information in the network. Each of the servers includes an interpreting unit that the interpretation subject information included in the image file transmitted by the imaging device.

An imaging method according to still another aspect of the present invention includes generating image data by capturing an image of a subject; and generating an image file including first interpretation subject information interpreted by any one of a plurality of servers in a network and second interpretation subject for access to any one of the plurality of servers through the network.

An image management method according to still another aspect of the present invention includes reading address information of a reference server from an image file including interpretation subject information, the interpretation subject information including the address information, the reference server storing format information for defining at least one of a format of electronic image data and a format of metadata associated with the image data; transmitting a transmission request for the format information to the reference server corresponding to the address information; receiving the format information from the reference server responding to the transmission request; interpreting the interpretation subject information included in the image file based on the format information; and generating a database of the interpretation subject information.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a view illustrating an image displayed on a display unit after capturing by the imaging device according to the first embodiment of the present invention;

FIG. 7 is a view illustrating a display example of a weblog;

FIG. 15 is a view schematically illustrating an overview of an image correction relative to a strobe;

FIG. 19 is a view illustrating an overview of a data structure of atmospheric temperature data;

FIG. 20 is a view illustrating an overview of a data structure of a direction data;

FIG. 21 is a view illustrating an overview of a data structure of event data;

FIG. 22 is a view illustrating an overview of a data structure of an encrypted metadata group stored in the reference server;

FIG. 29 is a flow chart illustrating a process content of a music server.

DETAILED DESCRIPTION OF THE PREFERRED EMBODIMENTS

Hereinafter, best modes for carrying out the present invention (hereinafter, referred to as embodiments) will be described.

First Embodiment

Figure 1:
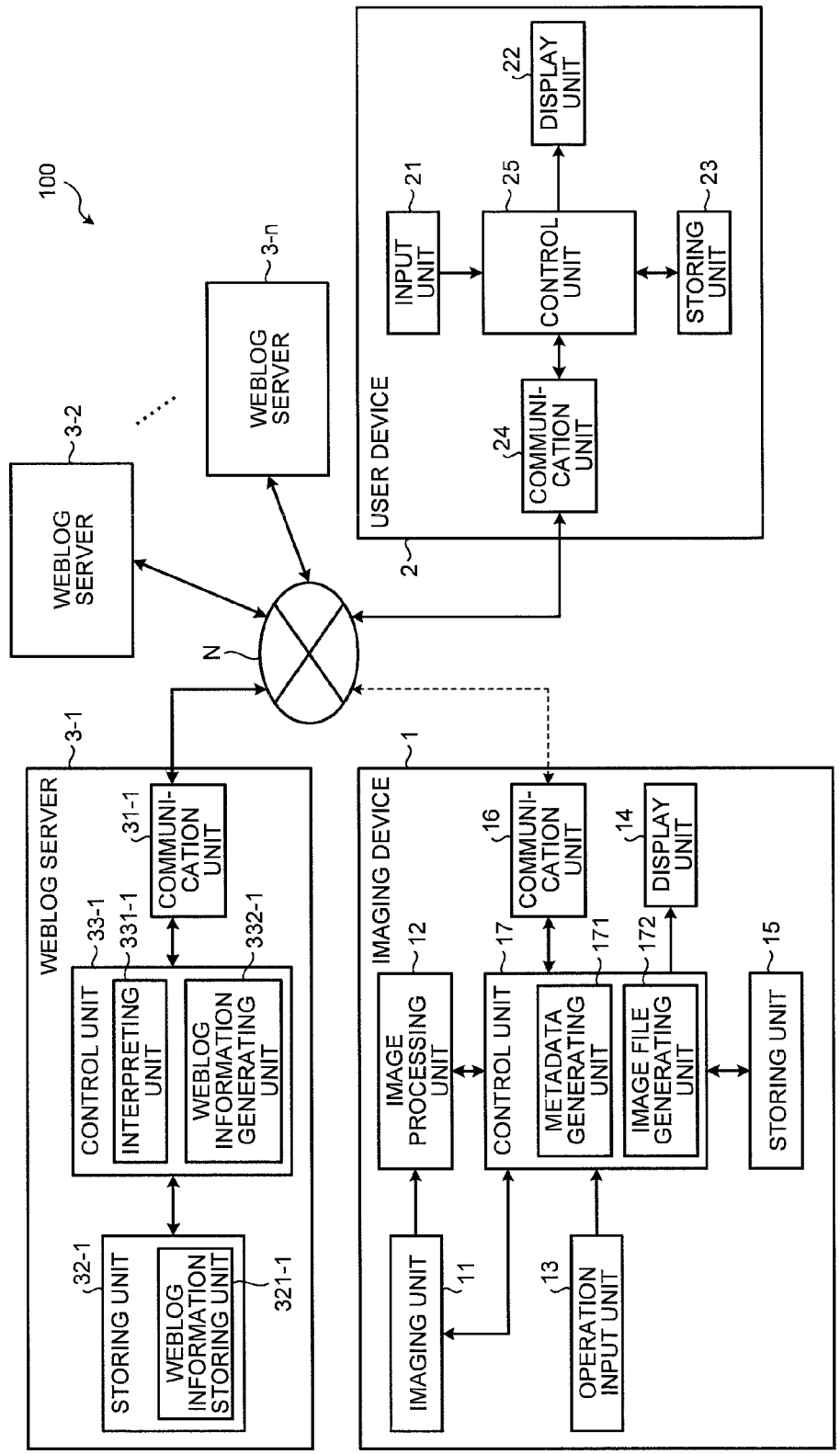
FIG. 1 is a view illustrating a configuration of an image communication system according to a first embodiment of the present invention.

FIG. 1 is a view illustrating a configuration of an image communication system according to a first embodiment of the present invention. An image communication system 100 illustrated in FIG. 1 includes an imaging device 1 acquiring an image and generating electronic image data, a user device 2 implemented by using a personal computer or the like, and a plurality of weblog servers 3-1, 3-2, . . . , and 3-$n$ ($n$ is a positive integer) that manage weblog information. The imaging device 1, the user device 2, and the plurality of weblog servers 3-1, 3-2, . . . , and 3-$n$ are connected to one another through a network N to be capable of communication. The network N is established by an appropriate combination of the Internet, a local area network (LAN), a telephone network, a packet network, a dedicated network, and the like.

The imaging device 1 includes an imaging unit 11 acquiring an image and generating image data of the image, an image processing unit 12 that performs a predetermined signal process on an image signal included in the image data generated by the imaging unit 11, an operation input unit 13 to which an operation signal of the imaging device 1 and the like are input, a display unit 14 that displays information including the image, a storing unit 15 that stores information including the image data, a communication unit 16 that is a communication interface for performing communication with the user device 2 and the plurality of weblog servers 3-1, 3-2, . . . , and 3-$n$ through the network N, and a control unit 17 that performs operation control of the imaging device 1. The imaging device 1 is connected to the network N through a wireless LAN.

The imaging unit 11 includes an optical system configured by one or a plurality of lenses to collect light from a subject existing in a predetermined visual field, a aperture for adjusting an incident amount of the light collected by the optical system, a shutter operating in response to a release input, an imaging element such as a charge coupled device (CCD) receiving the light that has passed through the aperture and the shutter and converting the light into an electric signal, and a signal processing circuit that performs a signal process such as amplification on an analog signal output from the imaging element and performing an A/D conversion to generate digital image data.

The operation input unit 13 includes a power switch of the imaging device 1, a release switch for inputting a release signal giving an imaging instruction, a mode selector that performs a switch between various operation modes which can be set in the imaging device 1, and the like.

The display unit 14 is implemented by using a display panel composed of liquid crystal or organic electro luminescence (EL), or the like, and appropriately displays not only the image data but also operation information of the imaging device 1 or information relative to capturing. Also, the operation input unit 13 may be implemented by a touch panel stacked on the display unit 14, so as to enable a user to perform an input of an operation signal based on information displayed on the display unit 14.

The storing unit 15 is implemented by using a semiconductor memory such as a flash memory or a dynamic random access memory (DRAM) installed in the imaging device 1 to be fixed. Further, the storing unit 15 may serve as a record medium interface recording information in a computer-readable record medium such as a memory card externally inserted and reading information which the record medium records.

The control unit 17 includes a metadata generating unit 171 that generates metadata according to information input from the operation input unit 13, and an image file generating unit 172 that generates an image file on the basis of the image data generated by the imaging unit 11 and the metadata generated by the metadata generating unit 171. The control unit 17 is implemented by using a central processing unit (CPU), or the like, and is connected to individual component portions of the imaging device 1, which are control subjects, through bus lines.

The user device 2 includes an input unit 21 implemented by using an interface such as a keyboard, a mouse, a touch panel, or the like, a display unit 22 implemented by using a display panel composed of liquid crystal or organic EL, a storing unit 23 that stores various information, a communication unit 24 that performs communication with the imaging device 1 and the weblog servers 3-1, 3-2, . . . , 3-n through the network N, and a control unit 25 that performs operation control of the user device 2. The user device 2 is implemented by a terminal such as a personal computer, a PDA, a portable phone, or the like, and is connected to the network N through a wire or wireless LAN.

The weblog server 3-1 includes a communication unit 31-1 which is a communication interface that performs communication with the imaging device 1, the user device 2, and a plurality of weblog servers 3-2, . . . , and 3-n through the network N, a storing unit 32-1 that stores various information including weblog information, and a control unit 33-1 that performs operation control of the weblog server 3-1.

The storing unit 32-1 includes a weblog information storing unit 321-1 that stores the weblog information.

The control unit 33-1 includes an interpreting unit 331-1 that interprets interpretation subject information of an image file transmitted from the imaging device 1, and a weblog information generating unit 332-1 that generates information relative to a weblog according to an interpretation result of the interpreting unit 331-1.

The configurations of the weblog servers 3-2, . . . , and 3-n are the same as the configuration of the weblog server 3-1. That is, a weblog server 3-j (j is an integer from 1 to n) includes a communication unit 31-j, a storing unit 32-j, and a control unit 33-j. However, metadata which the plurality of weblog servers 3-1, 3-2, . . . , and 3-n can interpret differ from each other, and weblog information which the plurality of weblog servers 3-1, 3-2, . . . , and 3-n generate differ from each other. In the following description, in a case of referring to the weblog servers 3-1, 3-2, . . . , and 3-n without distinction, the weblog servers 3-1, 3-2, . . . , and 3-n are simply referred to as "weblog servers 3". The weblog servers 3 include a server for managing a social networking system (SNS) such as Facebook (registered trademark) and a communication service such as Twitter (registered trademark). These servers can interpret human relationship information. The weblog servers 3 also include a music server for managing music information.

Figure 2:
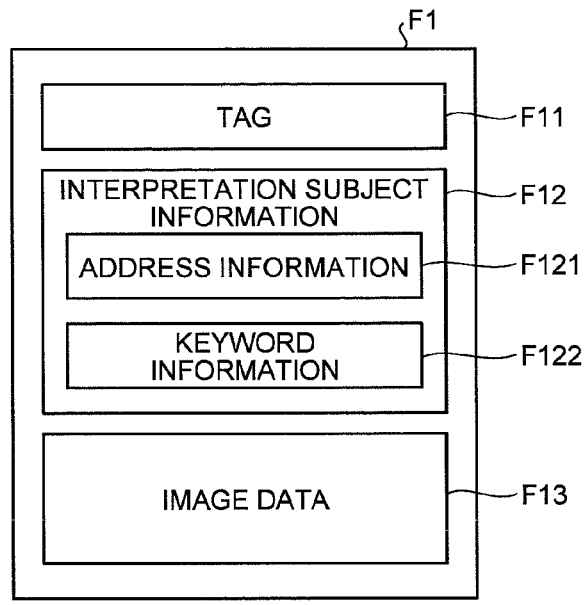
FIG. 2 is a view schematically illustrating a data structure of an image file generated by an image file generating unit of an imaging device according to the first embodiment of the present invention.

FIG. 2 is a view schematically illustrating a data structure of an image file generated by the image file generating unit 172 of the imaging device 1. The image file F1 illustrated in FIG. 2 includes a tag F11 defined according to the EXIF, interpretation subject information F12 to be interpreted by a weblog server 3 which is a transmission destination, and image data F13 which the imaging unit 11 has generated and on which a signal process has been performed by the image processing unit 12. Also, a voice input/output function may be provided to the imaging device 1 to make it possible to add voice data to the image file F1.

In the tag F11, information such as the model name of the imaging device 1, a manufacturer name, an aperture, a shutter speed, a capturing date and time, etc, is recorded. In the interpretation subject information F12, address information F121 (second interpretation subject information) including a URL of a weblog server 3 performing interpretation is recorded, and at the same time, keyword information F122 (first interpretation subject information) to be classified in the weblog server 3 is recorded as metadata. The image data F13 may be referred to as first interpretation subject information.

Figure 3:
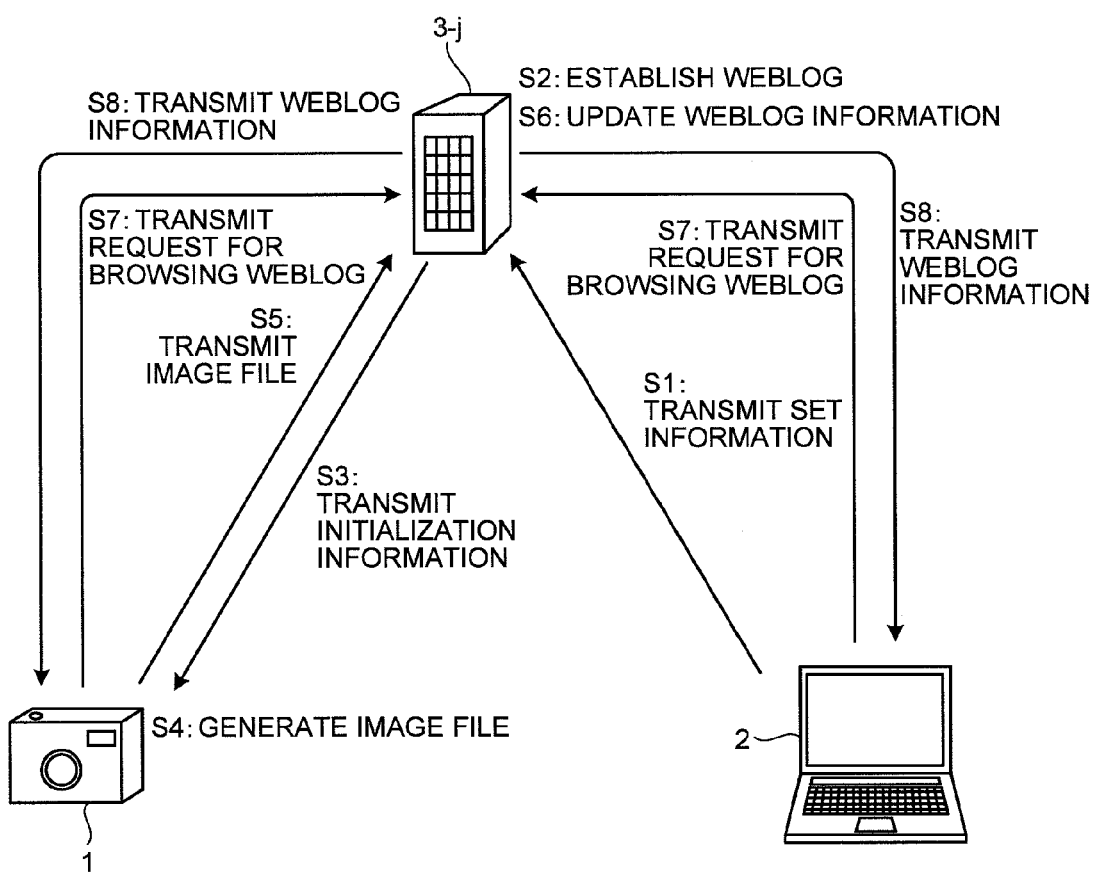
FIG. 3 is a view illustrating an overview of a process of the image communication system according to the first embodiment of the present invention.
Figures 4, 5:
FIG. 4 is a view schematically illustrating a portion of set information which a user device transmits to a weblog server.
FIG. 5 is a view illustrating a capturing situation using the imaging device according to the first embodiment of the present invention.

FIG. 3 is a view illustrating an overview of a process of the image communication system 100. In FIG. 3, first, the user device 2 transmits weblog set information to a desired weblog server 3-j (j is an integer from 1 to n) (step S1). FIG. 4 is a view schematically illustrating a portion of the set information which the user device 2 transmits to the weblog server 3-j. The set information F2 illustrated in FIG. 4 includes a title of a weblog to be used (a cooking weblog), a user ID, the imaging device ID of the imaging device 1 used, an IP address, classification keywords of photographs (1: spaghetti, 2: curry and rice, and 3: croquette), and the like.

The weblog server 3-j that has received the set information from the user device 2 records the set information in the storing unit 32-j, and makes a weblog corresponding to the set information at the same time (step S2). Next, the weblog server 3-j transmits initialization information to the imaging device 1 included in the set information (step S3). The initialization information which the weblog server 3-j transmits includes the URL of the weblog server 3-j and information on keywords input by the imaging device 1. The imaging device 1 records the received initialization information in the storing unit 15.

Next, the image file generating unit 172 generates an image file by using an image acquired by the imaging device 1 and metadata generated by the metadata generating unit 171 (step S4). FIG. 5 is a view illustrating a situation in which the user is taking a photograph by using the imaging device 1, specifically, a situation in which the user is taking a photograph of a curry and rice dish. After the user acquires an image of the curry and rice dish, on the display unit 14, a screen P1 prompting a decision of a keyword for photograph classification is displayed as illustrated in FIG. 6. FIG. 6 illustrates a state in which "2: curry and rice" has been selected as the keyword. In a case of confirming the selection at that state, the metadata generating unit 171 generates metadata corresponding to the keyword, "curry and rice". Next, the image file generating unit 172 generates an image file by embedding the metadata generated by the metadata generating unit 171 and the image data into the keyword information F122 illustrated in FIG. 2 at the same time. If the image data is the interpretation subject information, the keyword input is not necessary.

Subsequently, the imaging device 1 transmits the image file generated by the image file generating unit 172 to the weblog server 3-*j* through the communication unit 16 (step S5).

The weblog server 3-*j* receiving the image file updates the weblog information stored in the weblog information storing unit 321-1 (step S6). If the image data is the interpretation subject information, the weblog server 3-*j* interprets the image data by automatic image recognition. Instead of the automatic image recognition, the administrator of the weblog server 3-*j* may manually update the weblog information based on visual recognition of the image data.

Next, if the imaging device 1 or the user device 2 transmits a request for browsing the weblog to the weblog server 3-*j* (step S7), the weblog server 3-*j* transmits the weblog information to the imaging device 1 or the user device 2 which is the requester (step S8). FIG. 7 is a view illustrating a display example of a weblog displayed on the display unit 14 of the imaging device 1 or the display unit 22 of the user device 2. A weblog screen P2 illustrated in FIG. 7 shows a photograph weblog having a title 'cooking weblog', and photographs of curry and rice dishes taken on February 20th and February 27th are displayed. Arrows lying on the left and right side of the photographs show that it is scrollable, and it is possible to scroll photographs displayed on a screen by an input from the operation input unit 13 of the imaging device 1 or the input unit 21 of the user device 2. Also, if an item "To spaghetti" or "To croquette" is selected, the screen moves to a photograph weblog having a different keyword.

In this way, in the image communication system 100, the image file in which the image data generated by the imaging device 1 is associated with the keyword information which is metadata is used to make it possible to easily set and update the weblog by a weblog server 3.

Figure 8:
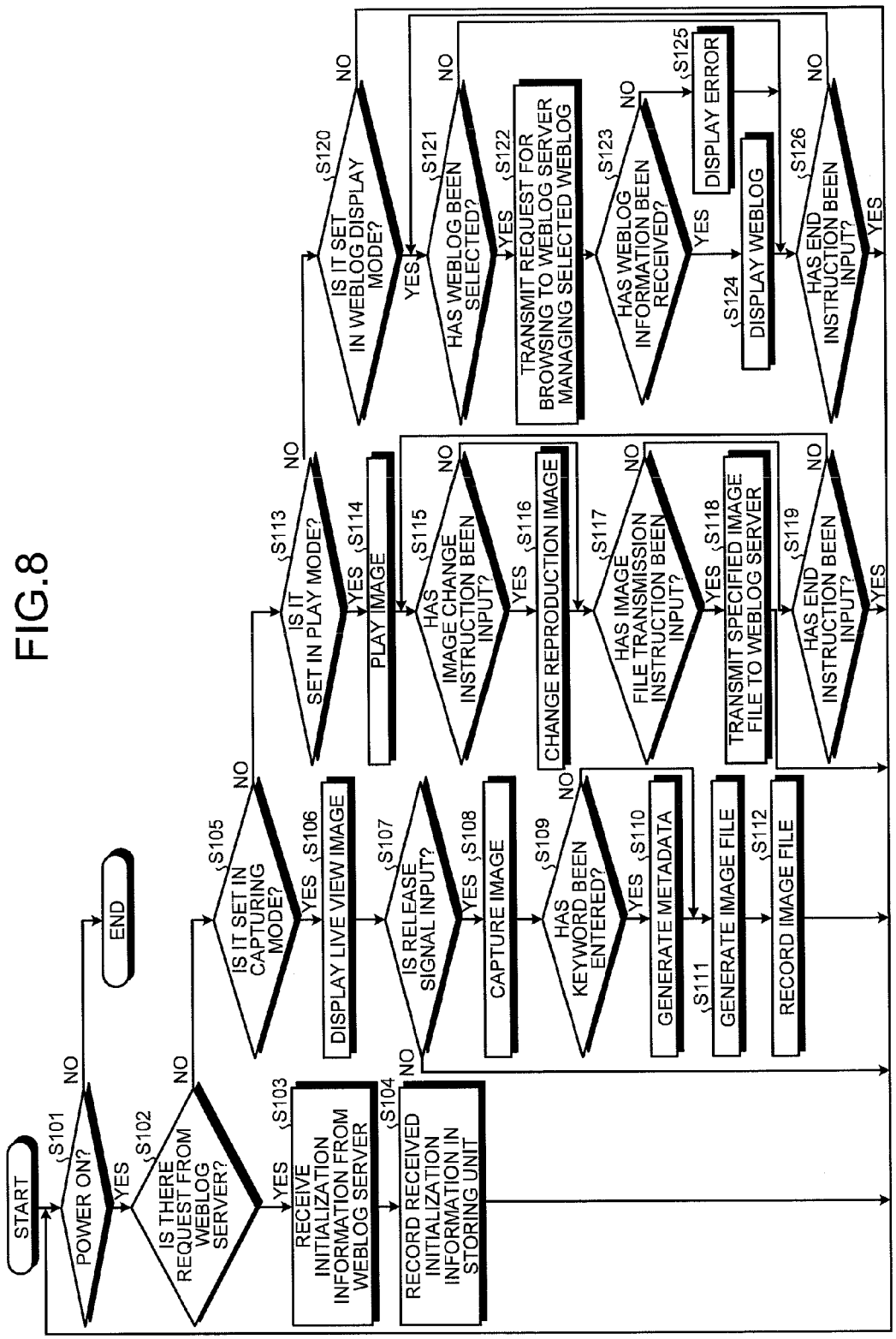
FIG. 8 is a flow chart illustrating a process content of the imaging device according to the first embodiment of the present invention.

Hereinafter, the process described with reference to FIG. 3 will be described in detail. FIG. 8 is a flow chart illustrating a more detailed process content of the imaging device 1. First, in a case where a power supply of the imaging device 1 is in an ON state (Yes in step S101), when there is a communication request from a weblog server 3 (Yes in step S102), the imaging device 1 establishes communication with the weblog server 3 through the communication unit 16 and receives initialization information (step S103), and records the received initialization information in the storing unit 15 (step S104). Also, in a case where the power supply of the imaging device 1 is not in the ON state (No in step S101), the imaging device 1 ends a series of processes.

Next, a case where there is no communication request from the weblog server 3 (No in step S102) will be described. In this case, when the imaging device 1 is set in a capturing mode (Yes in step S105), the control unit 17 displays a live view image on the display unit 14 (step S106).

Next, if a release button of the operation input unit 13 is pushed to input a release signal (Yes in step S107), the imaging unit 11 performs a capturing operation under control of the control unit 17 (step S108). Meanwhile, in a case where a release signal is not input from the operation input unit 13 (No in step S107), the imaging device 1 returns to step S101. It is preferable to perform the determination in step S107 according to whether the elapsed time from the start of the live view image display in step S106 exceeds predetermined time or not.

Next, in a case where a keyword for classification is input by the operation input unit 13 (Yes in step S109), the metadata generating unit 171 generates metadata relative to the keyword (step S110). Then, the image file generating unit 172 generates an image file including the metadata of the keyword as interpretation subject information (step S111), and records the generated image file in the storing unit 15 (step S112). Meanwhile, in a case where a keyword is not input by the operation input unit 13 (No in step S109), the image file generating unit 172 proceeds to step S111. After step S112, the imaging device 1 returns to step S101.

Next, a case where the imaging device 1 is not set in the capturing mode in step S105 (No in step S105) will be described. In this case, when the imaging device 1 is set in a reproducing mode (Yes in step S113), the control unit 17 reads a predetermined image from the storing unit 15, and plays and displays the predetermined image on the display unit 14 (step S114). Here, an image first displayed is, for example, the latest image. Next, in a case where a change instruction signal to instruct an image change is input by the operation input unit 13 (Yes in step S115), the control unit 17 reads a specified different image from the storing unit 15 and displays the image on the display unit 14 (step S116). In a case where a change instruction signal is not input (No in step S115), the imaging device 1 proceeds to step S117 to be described below.

After step S116, when a transmission instruction of an image file corresponding to the displayed image is input from the operation input unit 13 (Yes in step S117), the control unit 17 transmits the image file to the weblog server 3 having an URL recorded in the image file through the communication unit 16 (step S118). Meanwhile, when a transmission instruction of an image file corresponding to the displayed image is not input from the operation input unit 13 (No in step S117), if an end instruction is input from the operation input unit 13 (Yes in step S119), the imaging device 1 returns to step S101. In contrast, if an end instruction is not input (No in step S119), the imaging device 1 returns to step S115.

Next, a case where the imaging device 1 is not set in the play mode (No in step S113) but is set in a weblog display mode (Yes in step S120) will be described. In this case, when a weblog selection input is performed (Yes in step S121), the imaging device 1 transmits a request for weblog browsing to a weblog server 3 corresponding to the selected weblog (step S122). Then, if the imaging device 1 receives weblog information (Yes in step S123), the control unit 17 displays the received weblog information on the display unit 14 (step S124). Meanwhile, in a case where weblog information is not received from the weblog server even when predetermined time elapses since the imaging device 1 has transmitted a request for weblog browsing (No in step S123), the control unit 17 performs error display on the display unit 14 (step S125).

After step S124 or step S125, in a case where an end instruction to terminate the weblog is input by the operation input unit 13 (Yes in step S126), the imaging device 1 returns to step S101. In contrast, after step S124 or step S125, in a case where a weblog end instruction is not input by the operation input unit 13 (No in step S126), the imaging device 1 returns to step S121.

Further, in a case where a weblog is not selected in step S121 (No in step S121), the imaging device 1 proceeds to step S126.

Figure 9:
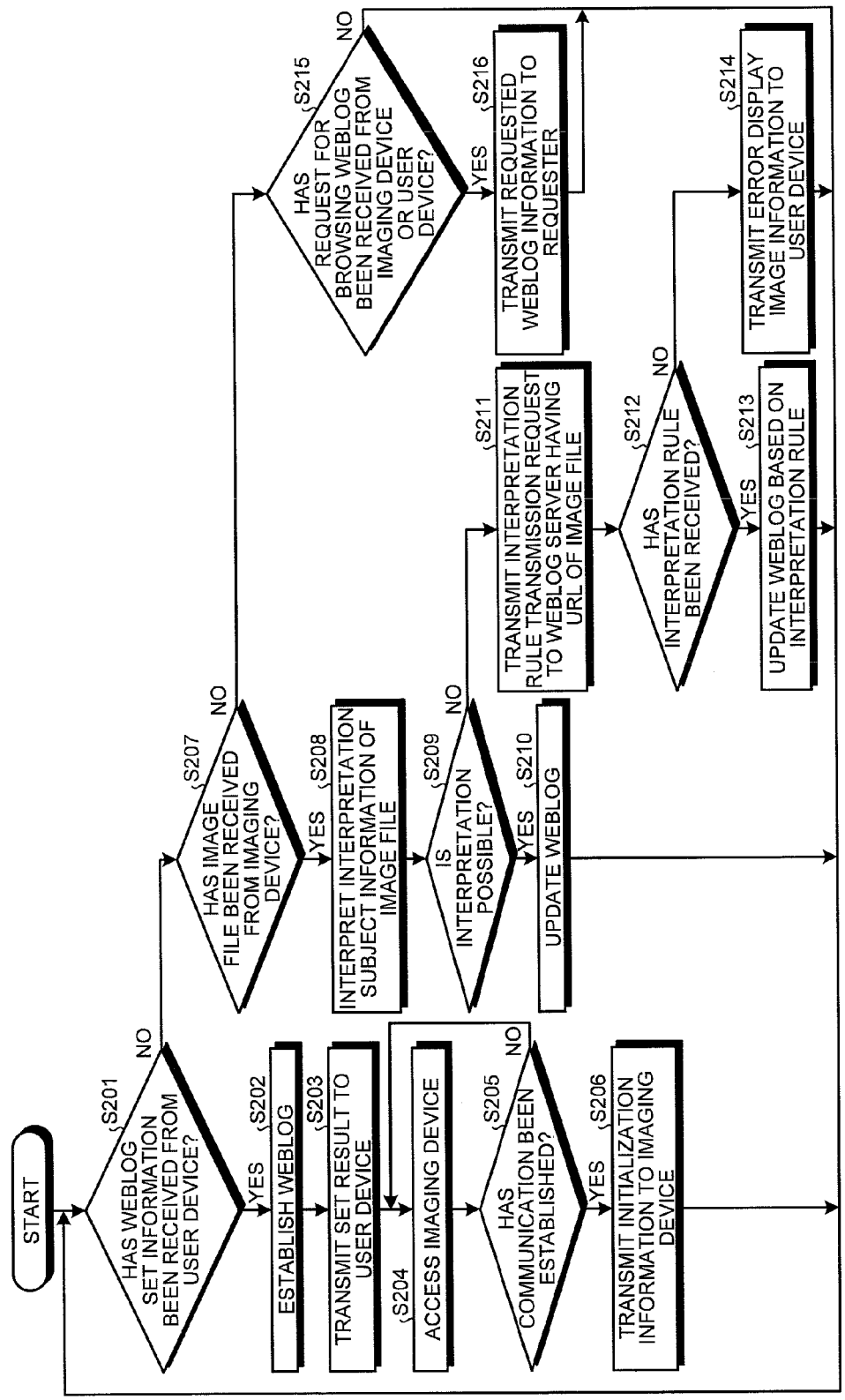
FIG. 9 is a flow chart illustrating a process content of the weblog server.

FIG. 9 is a flow chart illustrating a more detailed process content of the weblog server 3. First, in a case of receiving weblog set information from the user device 2 (Yes in step S201), the weblog server 3 performs a weblog establishing process on the basis of the received set information, and records information of the established weblog in the weblog information storing unit 321 (step S202). Then, the weblog server 3 transmits the set result of the established weblog to the user device 2 (step S203). Here, the set information of the weblog transmitted by the user device 2 is, for example, the set information F2 illustrated in FIG. 4.

Subsequently, the weblog server 3 accesses the imaging device 1 (step S204). In a case of establishing communication with the imaging device 1 (Yes in step S205), the weblog server 3 transmits initialization information corresponding to weblog information from the weblog information storing unit 321 to the imaging device 1 (step S206), and returns to step S201. In a case where communication with the imaging device 1 is not established (No in step S205), the weblog server 3 returns to step S204.

Next, a case where weblog set information is not received from the user device 2 in step S201 (No in step S201) will be described. In this case, when the weblog server 3 receives an image file from the imaging device 1 (Yes in step S207), the interpreting unit 331 interprets interpretation subject information included in the image file (step S208).

In a case where the interpreting unit 331 can interpret the interpretation subject information (Yes in step S209), the weblog information generating unit 332 updates the corresponding weblog on the basis of an interpretation result (step S210).

Meanwhile, in a case where the interpreting unit 331 cannot interpret the interpretation subject information (No in step S209), the weblog information generating unit 332 transmits an interpretation rule transmission request to the weblog server 3 having an URL recorded in the interpretation subject information of the image file (step S211). This corresponds to, for example, a situation in which a weblog server 3-$j$ establishing a photograph weblog for cooking receives an image file which only a weblog server 3-$k$ (1≤k≤n and k≠j) establishing a completely different field weblog such as a photograph weblog for music can interpret.

Next, in a case where the weblog server 3 receives an interpretation rule from another weblog server 3 (Yes in step S212), the weblog information generating unit 332 updates the weblog on the basis of the received interpretation (step S213). In a case where the weblog server 3 does not receive an interpretation rule from another weblog server 3 (No in step S212), the weblog server 3 transmits error display image information to the user device 2 (step S214).

Next, a case where the weblog server 3 does not receive a weblog establishing request from the user device 2 (No in step S201) and does not receive an image file from the imaging device 1 (No in step S207) will be described. In this case, when a request for browsing a weblog is received from the imaging device 1 or the user device 2 (Yes in step S215), the control unit 33 reads weblog information of the requested weblog from the weblog information storing unit 321, and transmits the read weblog information to the imaging device 1 or the user device 2 which is the requester (step S216).

Next, the weblog server 3 returns to step S201. Even in a case where a request for browsing a weblog is not received from the imaging device 1 or the user device 2 in step S215 (No in step S215), the weblog server 3 returns to step S201.

According to the first embodiment of the present invention described above, it is possible to implement flexible management which does not depend on a format of metadata included in an image file.

Further, according to the first embodiment, since image classification with high expandability is possible, it is possible to allow for flexibly coping with even a case where system evolution anticipating future needs is difficult in a development stage of an imaging device. As a result, it is also possible to meet various needs of users.

Furthermore, according to the first embodiment, with respect to a user making a special weblog on the Internet, it is possible to implement a service with high expandability which reflects the taste of the user and the kind of an imaging device.

Second Embodiment

Figure 10:
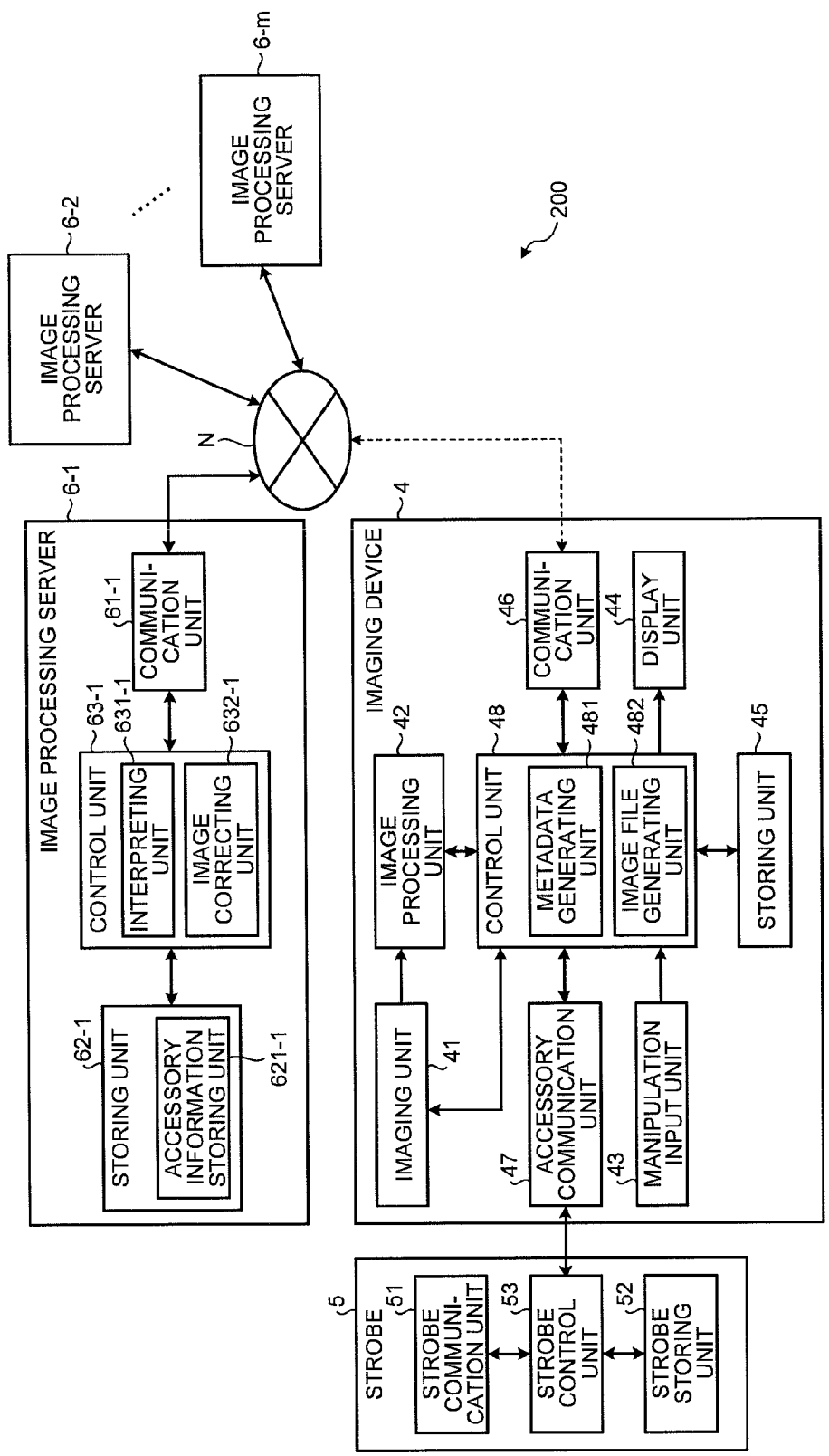
FIG. 10 is a view illustrating a configuration of an image communication system according to a second embodiment of the present invention.

FIG. 10 is a view illustrating a configuration of an image communication system according to a second embodiment of the present invention. An image communication system 200 illustrated in FIG. 10 includes an imaging device 4 that acquires an image and generates electronic image data, a strobe 5 that is an accessory attached to the imaging device 4, and a plurality of image processing servers 6-1, 6-2, . . . , and 6-$m$ ($m$ is a positive integer) that manage information of the accessory and perform a correction on the image data, which the imaging device 4 has generated, on the basis of the imaging accessory information. The imaging device 4 and the plurality of image processing servers 6-1, 6-2, . . . , and 6-$m$ are connected to one another through a network N to be capable of communication.

The imaging device 4 includes an imaging unit 41 acquiring an image and generating image data of the image, an image processing unit 42 performing a predetermined signal process on an image signal included in the image data having been generated by the imaging unit 41, an operation input unit 43 to which a operation signal of the imaging device 4 and the like are input, a display unit 44 displaying information including the image, a storing unit 45 storing information including the image data, a communication unit 46 which is a communication interface for performing communication with the plurality of image processing servers 6-1, 6-2, . . . , and 6-$m$ through the network N, an accessory communication unit 47 which is a communication interface for performing communication with the strobe 5 which is an accessory mounted to the imaging device 4, and a control unit 48 that performs operation control of the imaging device 4. The imaging device 4 is connected to the network N through a wireless LAN.

The control unit 48 includes a metadata generating unit 481 generating metadata according to information input from the operation input unit 43, and an image file generating unit 482 generating an image file on the basis of the image data that has been generated by the imaging unit 41 and the metadata that has been generated by the metadata generating unit 481. The control unit 48 is implemented by using a CPU or the like, and is connected to individual component portions of the imaging device 1, which are subjects to be controlled, through bus lines.

The strobe 5 includes a strobe communication unit 51 that is connected with the accessory communication unit 47 of the imaging device 4 and that performs communication with the imaging device 4, a strobe storing unit 52 that stores information such as the kind of the strobe, a manufacturer, and the like, and a strobe control unit 53 that performs operation control of the strobe.

The image processing server 6-1 includes a communication unit 61-1 which is a communication interface for performing communication with the imaging device 4 and the plurality of image processing servers 6-1, 6-2, . . . , and 6-$m$ through the network N, a storing unit 62-1 that stores various information including the accessory information, and a control unit 63-1 that performs operation control of the image processing server.

The storing unit 62-1 includes an accessory information storing unit 621-1 that stores information of a predetermined accessory. Hereinafter, it is assumed that the accessory information storing unit 621-1 stores information of the strobe 5 serving as an accessory.

The control unit 63-1 includes an interpreting unit 631-1 that interprets interpretation subject information of an image file transmitted from the imaging device 4, and an image correcting unit 632-1 that performs a correction on the image data according to an interpretation result of the interpreting unit 631-1. The image processing server 6-1 has a function of performing a correction on an image on the basis of information relative to the strobe 5 stored in the accessory information storing unit 621-1. Here, examples of accessory information relative to the strobe 5 can include light distribution information according to the kind of the strobe 5.

The configurations of the image processing servers 6-2, . . . , and 6-$m$ are the same as the configuration of the image processing server 6-1. That is, an image processing server 6-$j$ (j is an integer from 1 to m) includes a communication unit 61-$j$, a storing unit 62-$j$, and a control unit 63-$j$. However, metadata which the plurality of image processing servers 6-1, 6-2, . . . , and 6-$m$ can interpret differ from each other. In other words, accessories which are interpretation subjects for the plurality of image processing servers 6-1, 6-2, . . . , and 6-$m$ are different from each other. Examples of the accessories include a lens, an electric view finder (EVF), and the like, in addition to the above-mentioned strobe. In the following description, in a case of referring to the image processing servers 6-1, 6-2, . . . , and 6-$m$ without distinction, the image processing servers 6-1, 6-2, . . . , and 6-$m$ are simply referred to as "image processing servers 6".

Figure 11:
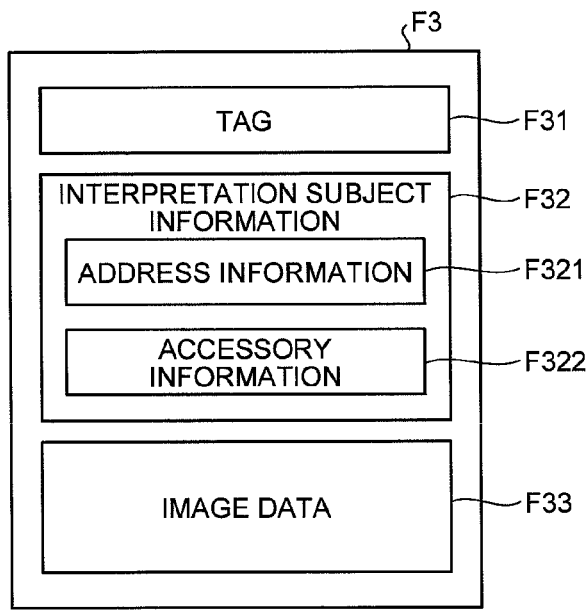
FIG. 11 is a view illustrating a data structure of an image file generated by an image file generating unit of an imaging device according to the second embodiment of the present invention.

FIG. 11 is a view illustrating a data structure of an image file generated by the image file generating unit 482 of the imaging device 4. An image file F3 illustrated in FIG. 11 includes a tag F31 defined according to the EXIF, interpretation subject information F32 to be interpreted by an image processing server 6 which is a transmission destination, and image data F33 which the imaging unit 41 has generated and on which a signal process has been performed by the image processing unit 42.

In the interpretation subject information F32, address information F321 (second interpretation subject information) that includes an URL of an image processing server 6 to perform interpretation is recorded, and at the same time, accessory information F322 (first interpretation subject information) which is information to be interpreted by the image processing server is recorded. Here, the accessory information is metadata including the kind of the accessory, the manufacturer, the data of manufacture, a URL of an image processing server that stores information relative to the accessory.

The interpretation subject information according to the second embodiment is different in quality from the interpretation subject information according to the first embodiment. However, the second embodiment has in common with the first embodiment the technological concept in which the imaging device generates metadata including interpretation subject information and transmits the metadata to a server that can interpret the interpretation subject information included in the metadata among a plurality of servers (image processing servers) connected to the imaging device through a network.

Figure 12:
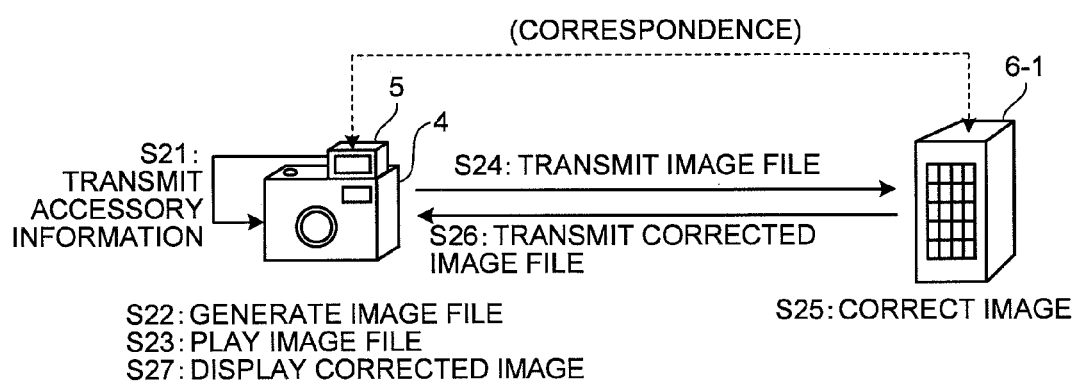
FIG. 12 is a view illustrating an overview of a process of the image communication system according to the second embodiment of the present invention.

FIG. 12 is a view illustrating an overview of a process in the image communication system 200. If the strobe 5 is attached to the imaging device 4, the accessory information is transmitted from the strobe 5 to the imaging device 4 (step S21). Then, an image file is generated on the basis of an image acquired by the imaging device 4 and metadata generated by the metadata generating unit 481 (step S22). The image is played in the imaging device 4 (step S23). In a case where a user determines that a correction is necessary, the image file is transmitted from the imaging device 4 to the image processing server 6-1 by an operation input of the user (step S24).

The image processing server 6-1 that has received the image file interprets interpretation subject information included in the image file and performs a correction on the image (step S25). More specifically, the image processing server 6-1 performs a correction on the image on the basis of the accessory information including the light distribution information of the strobe 5, and generates a corrected image file including the corrected image data.

Then, the image processing server 6-1 transmits the corrected image file to the imaging device 4 (step S26).

The imaging device 4 that has received the corrected image file from the image processing server 6-1 displays the corrected image on the display unit 44 (step S27).

Figure 13:
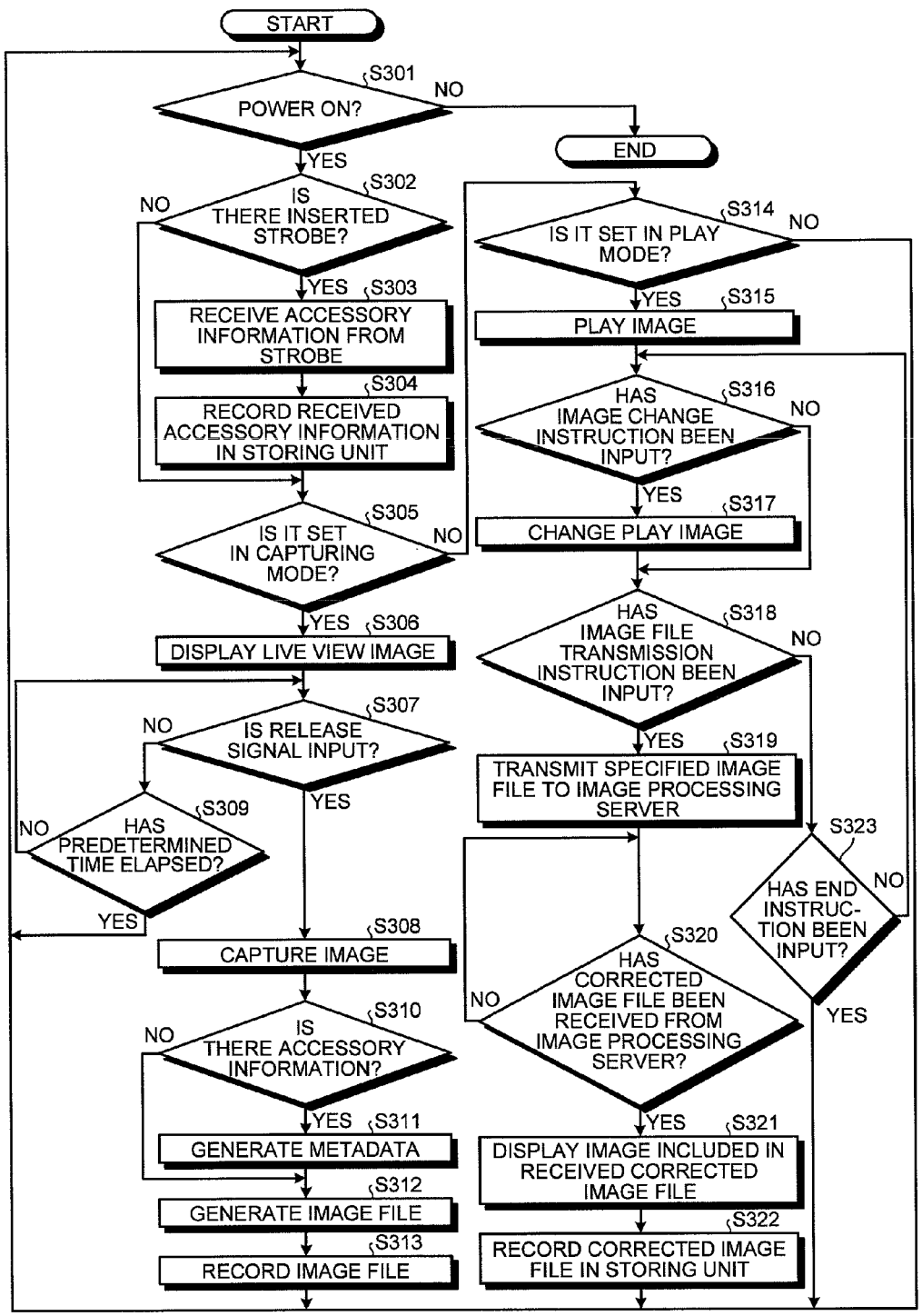
FIG. 13 is a flow chart illustrating a process content of the imaging device according to the second embodiment of the present invention.

FIG. 13 is a flow chart illustrating a more detailed process content of the imaging device 4. In FIG. 13, in a case where the power supply of the imaging device 4 is in an ON state (Yes in step S301), when the strobe 5 is inserted (Yes in step S302) as an accessory, the imaging device 4 receives the accessory information from the strobe 5 (step S303), and records the received information in the storing unit 45 (step S304). In a case where the strobe 5 is not inserted (No in step S302), the imaging device 4 proceeds to step S305 to be described below. Further, in a case where the power supply of the imaging device 4 is not in the ON state (No in step S301), the imaging device 4 ends a series of processes.

Processes after step S304 differ from each other according to modes in which the imaging device 4 is set. First, a case where the imaging device 4 is set in a capturing mode (Yes in step S305) will be described. In this case, the control unit 48 displays a live view image on the display unit 44 (step S306).

Then, if a release button of the operation input unit 43 is pushed to input a release signal (Yes in step S307), the imaging unit 41 performs a capturing operation under control of the control unit 48 (step S308). Meanwhile, in a case where a release signal is not input from the operation input unit 43 (No in step S307), if predetermined time has not elapsed (No in step S309), the imaging device 4 returns to step S307. If the predetermined time has elapsed (Yes in step S309), the imaging device 4 returns to step S301.

Next, in a case where the accessory is inserted into the imaging device 4 and the storing unit 45 has the accessory information stored therein (Yes in step S310), the metadata generating unit 481 generates metadata relative to the accessory information (step S311). Then, the image file generating unit 482 generates an image file including the metadata of the accessory information as interpretation subject information (step S312), and records the generated image file in the storing unit 45 (step S313). Meanwhile, in a case where the accessory is not attached to the imaging device 4 and the storing unit 45 does not have the accessory information stored therein (No in step S310), the image file generating unit 482 proceeds to step S312. After step S313, the imaging device 4 returns to step S301.

Next, a case where the imaging device 4 is not set in the capturing mode (No in step S305) will be described. In this case, when the imaging device 4 is set in a play mode (Yes in step S314), the control unit 48 reads a predetermined image from the storing unit 45, and plays and displays the image on the display unit 44 (step S315). Here, an image first displayed is, for example, the latest image. Next, in a case where a change instruction signal to instruct an image change in input by the operation input unit 43 (Yes in step S316), the control unit 48 reads a specified different image from the storing unit 45 and displays the image on the display unit 44 (step S317). In a case where a change instruction signal is not input in step S316 (No in step S316), the imaging device 4 proceeds to step S318 to be described below.

After step S317, when a transmission instruction of an image file of the displayed image is not input from the operation input unit 43 (No in step S318), the control unit 48 transmits the image file to an image processing server 6 having an URL recorded in the image file through the communication unit 46 (step S319).

Next, in a case where a corrected image file after correction is received from the image processing server 6 (Yes in Yes S320), the imaging device 4 displays a corrected image included in the received corrected image file on the display unit 44 (step S321), records the corrected image file in the storing unit 45 (step S322), and returns to step S301.

In a case where a corrected image file after correction is not received from the image processing server 6 in step S320 (No in step S320), the imaging device 4 repeats step S320. Further, in a case where the image file is not returned even when predetermined time elapses since the image file has been transmitted to the image processing server 6, the control unit 48 may perform error display on the display unit 44. In this case, the control unit 48 may further transmit a transmission request of the corrected image file to the image processing server 6.

When a transmission instruction of the image file is not input from the operation input unit 43 in step S318 (No in step S318), if an end instruction of the play mode is input (Yes in step S323), the imaging device 4 returns to step S301. Meanwhile, when an image file transmission instruction is not input from the operation input unit 43 in step S318 (No in step S318) and a play-mode end instruction is not input (No in step S323), the imaging device 4 returns to step S316.

If the imaging device 4 is not set in the play mode in step S314 (No in step S314), the imaging device 4 returns to step S301.

Figure 14:
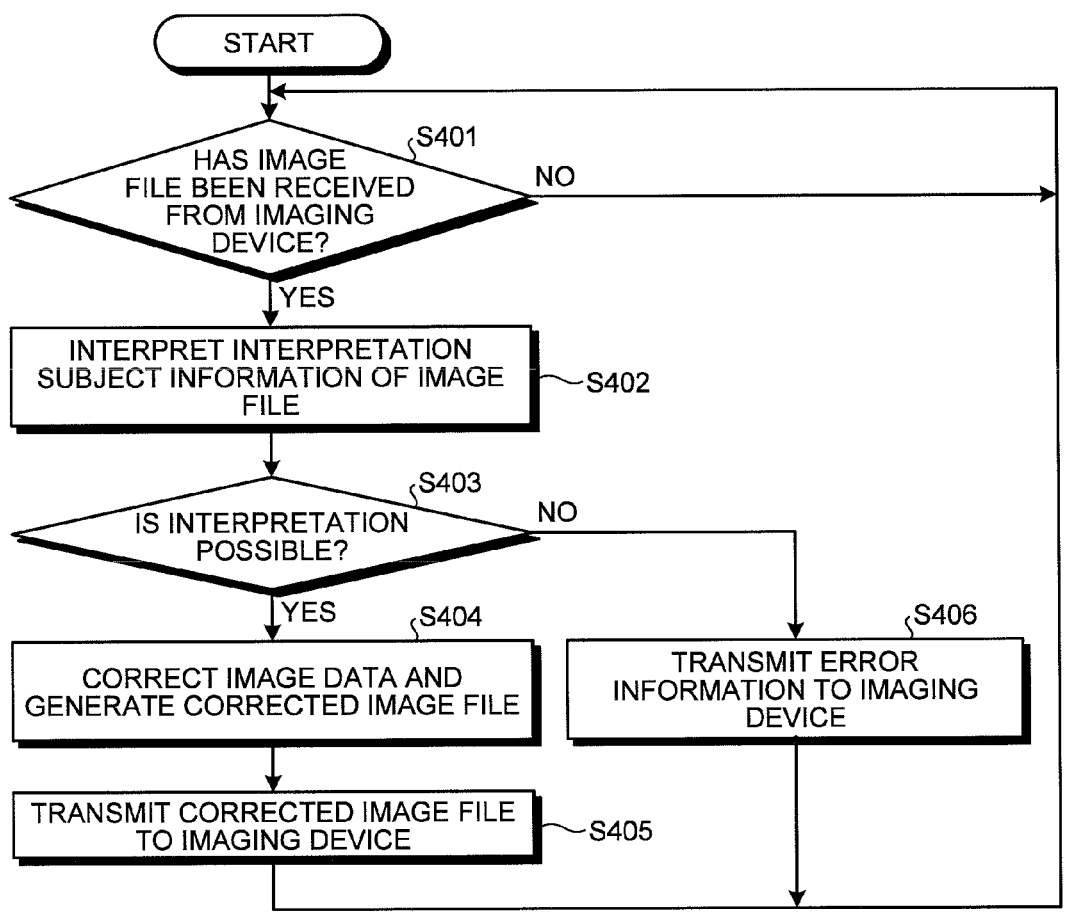
FIG. 14 is a flow chart illustrating a process content of an image processing server.

FIG. 14 is a flow chart illustrating a more detailed process content of an image processing server 6. In a case where the image processing server 6 receives an image file from the imaging device 4 (Yes in step S401), the interpreting unit 631 interprets interpretation subject information (step S402). In a case where the interpreting unit 631 can interpret the interpretation subject information (Yes in step S403), the image correcting unit 632 performs a correction on image data included in the image file, on the basis of an interpretation result, and generates a corrected image file including the corrected image data (step S404). More specifically, the image correcting unit 632 performs a correction on the basis of accessory information corresponding to the interpretation result of the interpreting unit 631.

FIG. 15 is a view schematically illustrating an overview of an image correction relative to the strobe 5. In FIG. 15, in uncorrected image data, the periphery of a subject is dark by the orientation of light of the strobe 5 ((a) of FIG. 15). The image processing server 6 can perform correction for brightening the periphery on that image on the basis of the light distribution information of the strobe stored in the storing unit 62, thereby generating a corrected image without influence of light distribution of the strobe ((b) of FIG. 15).

Next, the image processing server 6 transmits a corrected image file including the corrected image data to the imaging device 4 which is the transmitter of the uncorrected image file (step S405).

In a case where the interpreting unit 631-1 cannot interpret the interpretation subject information included in the image file in step S403 (No in step S403), the image processing server 6 transmits error information to the imaging device 4 (step S406).

In a case where the image file is not received from the imaging device 4 (No in step S401), the image processing server 6 repeats step S401.

According to the second embodiment of the present invention described above, similar to the first embodiment, it is possible to implement flexible management which does not depend on a format of metadata included in an image file.

Further, according to the second embodiment, even in a case of mounting various accessories onto the imaging device separately from a main body, it is possible to reduce the restrictions of the kinds of accessories.

Third Embodiment

Figure 16:
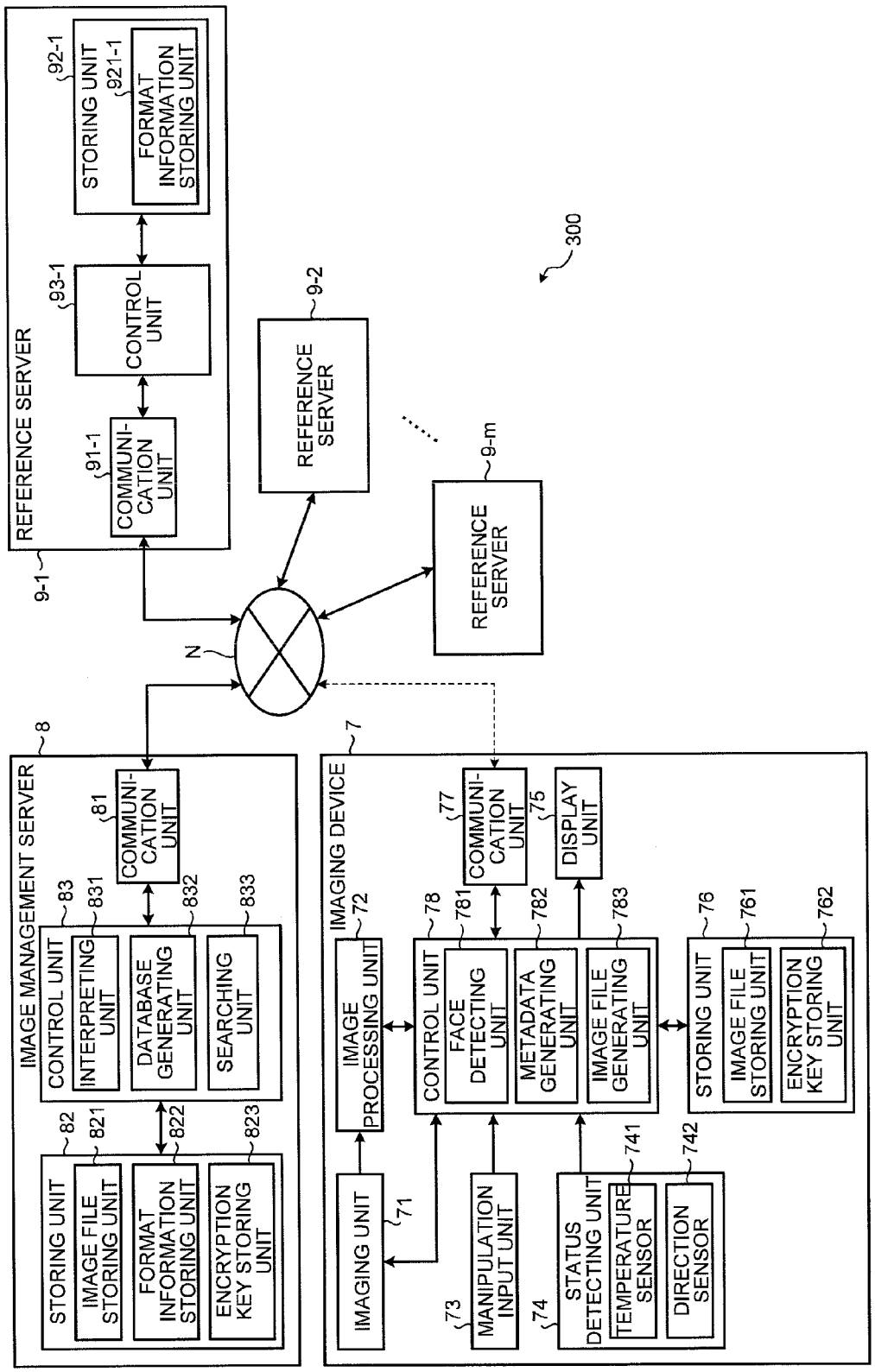
FIG. 16 is a view illustrating a configuration of an image communication system according to a third embodiment of the present invention.

FIG. 16 is a view illustrating a configuration of an image communication system according to a third embodiment of the present invention. An image communication system 300 illustrated in FIG. 16 includes an imaging device 7 that acquires an image and generates electronic image data, an image management server 8 that manages an image file, and a plurality of reference servers 9-1, 9-2, . . . , and 9-*m* (m is a positive integer) for interpreting interpretation subject information included in the image file. The imaging device 7, the image management server 8, and the plurality of reference servers 9-1, 9-2, . . . , and 9-*m* are connected with each other through a network N to be capable of communication.

The imaging device 7 includes an imaging unit 71 that acquires an image and generating image data of the image, an image processing unit 72 that performs a signal process on an image signal included in the image data having been generated by the imaging unit 71, an operation input unit 73 to which an operation signal of the imaging unit 71 and the like are input, a status detecting unit 74 that detects the status of the imaging device 7, a display unit 75 displaying information including the image, a storing unit 76 that stores information including the image data, a communication unit 77 which is a communication interface for performing communication with the image management server 8 and the plurality of reference servers 9-1, 9-2, . . . , and 9-*m* through the network N, and a control unit 78 that performs operation control of the imaging device 7. The imaging device 7 is connected to the network N through a wireless LAN.

The imaging unit 71, the image processing unit 72, the display unit 75, and the communication unit 77 have the same functional configurations as the imaging unit 11, the image processing unit 12, the display unit 14, and the communication unit 16 of the imaging device 1, respectively.

The operation input unit 73 has a character input function in addition to the same function as the operation input unit 13. For example, that function can be implemented by providing a touch panel to a display panel of the display unit 75.

The status detecting unit 74 includes a temperature sensor 741 that detects the temperature of the imaging device 7, and a direction sensor 742 that detects a direction which the front surface of the imaging device 7 faces. The status detecting unit 74 may include various sensors such as a GPS sensor that receives a signal from a GPS communication satellite and detects the location of the imaging device 7 or a sound collecting sensor that detects noise around the imaging device 7.

The storing unit 76 includes an image file storing unit 761 that stores an image file in which the image data acquired by the imaging unit 71 and metadata including information detected by the status detecting unit 74 are recorded, and an encryption key storing unit 762 that stores an encryption key for encrypting and decrypts a portion of the metadata included in the image file.

The control unit 78 includes a face detecting unit 781 that detects the face of a person included in the image data, a metadata generating unit 782 that generates metadata on the basis of the status of the imaging device 7 detected by the status detecting unit 74, and an image file generating unit 783 that generates an image file on the basis of the image data generated by the imaging unit 71 and the metadata generated by the metadata generating unit 782. The control unit 78 is implemented by using a CPU or the like, and is connected to individual component portions of the imaging device 7, which are control subjects, through bus lines.

The image management server 8 includes a communication unit 81 which is a communication interface for performing communication with the imaging device 7 and the plurality of reference servers 9-1, 9-2, . . . , and 9-m through the network N, a storing unit 82 that stores various information including the image file, and a control unit 83 that performs operation control of the image management server 8.

The storing unit 82 includes an image file storing unit 821 that stores the image file, a format information storing unit 822 that stores format information for interpreting interpretation subject information included in the image file, and an encryption key storing unit 823 that stores an encryption key for encrypting and decrypting encrypted metadata of metadata included in the image file.

The control unit 83 includes an interpreting unit 831 that interprets the metadata of the image file on the basis of the format information, a database generating unit 832 that generates a database relative to the metadata of the image file according to the interpretation result of the interpreting unit 831, and a searching unit 833 that performs image file search in response to a search request transmitted from the imaging device 7.

The reference server 9-1 includes a communication unit 91-1 which is a communication interface for performing communication with the imaging device 7, the image management server 8, and a plurality of reference servers 9-2, . . . , and 9-m through the network N, a storing unit 92-1 that stores format information for interpreting interpretation subject information included in the image file, and a control unit 93-1 that performs operation control of the reference server 9-1. The storing unit 92-1 includes a format information storing unit 921-1.

The configurations of the reference servers 9-2, . . . , and 9-m have the same as the configuration of the reference server 9-1. That is, a reference server 9-j (j is an integer form 1 to m) includes a communication unit 91-j, a storing unit 92-j, and a control unit 93-j. However, metadata which the reference servers 9-j can interpret are different from each other. Hereinafter, in a case of referring to the reference servers 9-1, 9-2, . . . , and 9-m without distinction, the reference servers 9-1, 9-2, . . . , and 9-m are simply referred to as "reference servers 9".

Figures 17, 18:
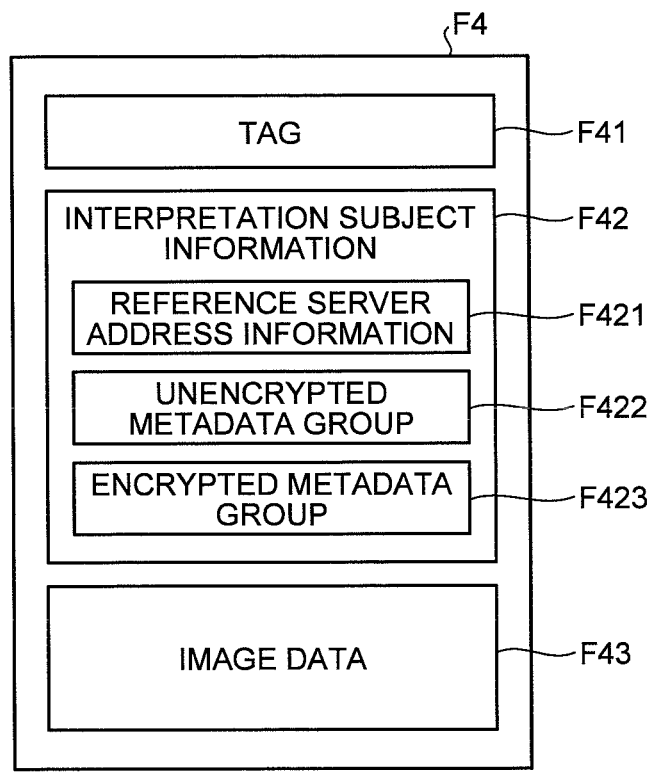
FIG. 17 is a view schematically illustrating a data structure of an image file generated by an image file generating unit of an imaging device according to the third embodiment of the present invention.
FIG. 18 is a view illustrating an overview of a data structure of an unencrypted metadata group stored in a reference server.

FIG. 17 is a view schematically illustrating a data structure of an image file generated by an image file generating unit 783 of the imaging device 7. The image file F4 illustrated in FIG. 17 includes a tag F41 defined according to the EXIF, interpretation subject information F42 to be interpreted by a reference server 9 which is a transmission destination, and image data F43 which has been generated by the imaging unit 71 and on which the signal process has been performed by the image processing unit 72.

The interpretation subject information F42 includes reference server address information F421 (second interpretation subject information) including an URL of a reference server 9-j to perform interpretation, a unencrypted metadata group F422 (first interpretation subject information) which unencrypted metadata, and an encrypted metadata group F423 (first interpretation subject information) which is encrypted metadata.

The interpretation subject information according to the third embodiment is different in quality from the interpretation subject information according to the first and second embodiments. However, the third embodiment has in common with the first and second embodiments the technological concept in which the imaging device generates metadata including interpretation subject information and transmits the metadata to a server that can interpret the interpretation subject information included in the metadata among a plurality of servers (reference servers) connected to the imaging device through a network.

FIG. 18 is a view illustrating an overview of data structure of the unencrypted metadata group F422 of the format information stored in the reference server 9. Table D1 illustrated in FIG. 18 shows that the unencrypted metadata group F422 includes metadata such as temperature data, direction data, event data, and the like. With respect to those metadata, a start address in the image file is recorded, and at the same time, the data length thereof is recorded. Here, the start address in Table D1 is a relative address from a head position of the image file.

FIG. 19 is a view illustrating an overview of a data structure of the temperature data. Table D2 illustrated in FIG. 19 shows that the temperature data having a data length of 1 byte includes 7 bits assigned for the numerical value of a temperature (° C.) and the remaining 1 bit assigned for the sign of the temperature.

FIG. 20 is a view illustrating an overview of a data structure of the direction data. Table D3 illustrated in FIG. 20 shows, for example, that the "East" direction is assigned to data "00000001".

FIG. 21 is a view illustrating an overview of a data structure of the event data. Table D4 illustrating in FIG. 21 shows that an event "sports day" is assigned to data "00000001".

FIG. 22 is a view illustrating an overview of a data structure of the encrypted metadata group F423 of the format information stored in the reference server 9-j. Table D5 illustrated in FIG. 22 shows that the encrypted metadata group F423 includes private metadata such as persons and messages capable of identifying persons. The data length of each metadatum further includes information relative to encryption.

Figure 23:
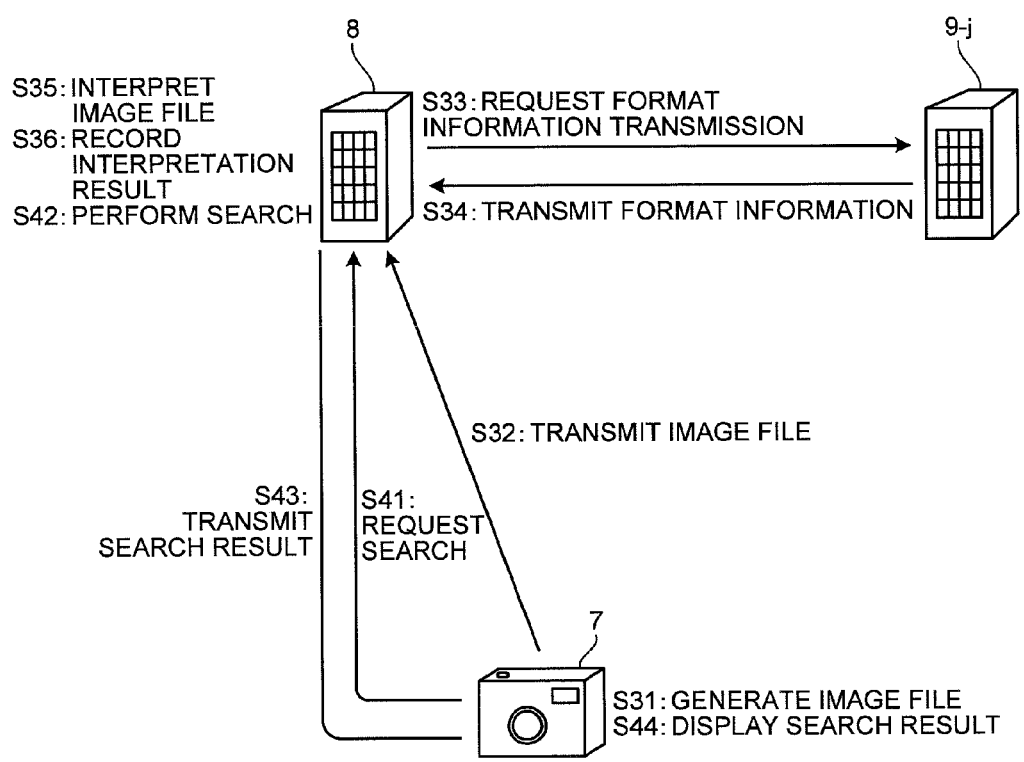
FIG. 23 is a view illustrating an overview of a process of the image communication system according to the third embodiment of the present invention.

FIG. 23 is a view illustrating an overview of a process of the image communication system 300. In FIG. 23, first, the imaging device 7 generates an image file on the basis of an acquired image (step S31). The generated image file is transmitted to the image management server 8 by an instruction input of a user (step S32).

On the basis of the reference server address information F421 included in the image file, the image management server 8 that has received the image file from the imaging device 7 transmits a format information transmission request to a reference server 9-*j* having an URL recorded in address information of the address information (step S33).

The reference server 9-*j* that has received the format information transmission request transmits format information stored in the storing unit 92-*j* to the image management server 8 (step S34).

The image management server 8 receiving the format information from the reference server 9-*j* interprets metadata included in the image file on the basis of the format information (step S35), and records the interpretation result in the format information storing unit 822 (step S36). Further, in a case where decryption is required when the interpretation is performed since the encrypted metadata group F423 is written in the image file, the image management server 8 reads the encryption key from the encryption key storing unit 823 and performs decryption.

Performing the process of the image communication system 300 enables the image management server 8 to interpret all of image files with different formats by making an inquiry with the reference server 9. As a result, it is possible to integrally record interpreted information regardless of the formats of the image files.

Continuously referring to FIG. 23, a search process on the image files of which a database has been compiled as described above will be described. In a case of performing the search process, first, the imaging device 7 specifies search criteria by a keyword input or the like, and transmits a search request to the image management server 8 (step S41).

The searching unit 833 of the image management server 8 that has received the search request from the imaging device 7 searches the image file storing unit 821 for an image file matching the search criteria (step S42). Next, the image management server 8 transmits the image file, which is the search result, to the imaging device 7 (step S43).

The imaging device 7 that has received the search result from the image management server 8 displays the received search result on the display unit 75 (step S44).

As described above, in the image communication system 300, since the image management server 8 performs searching, it is possible to easily perform searching on image files with different formats.

Figure 24:
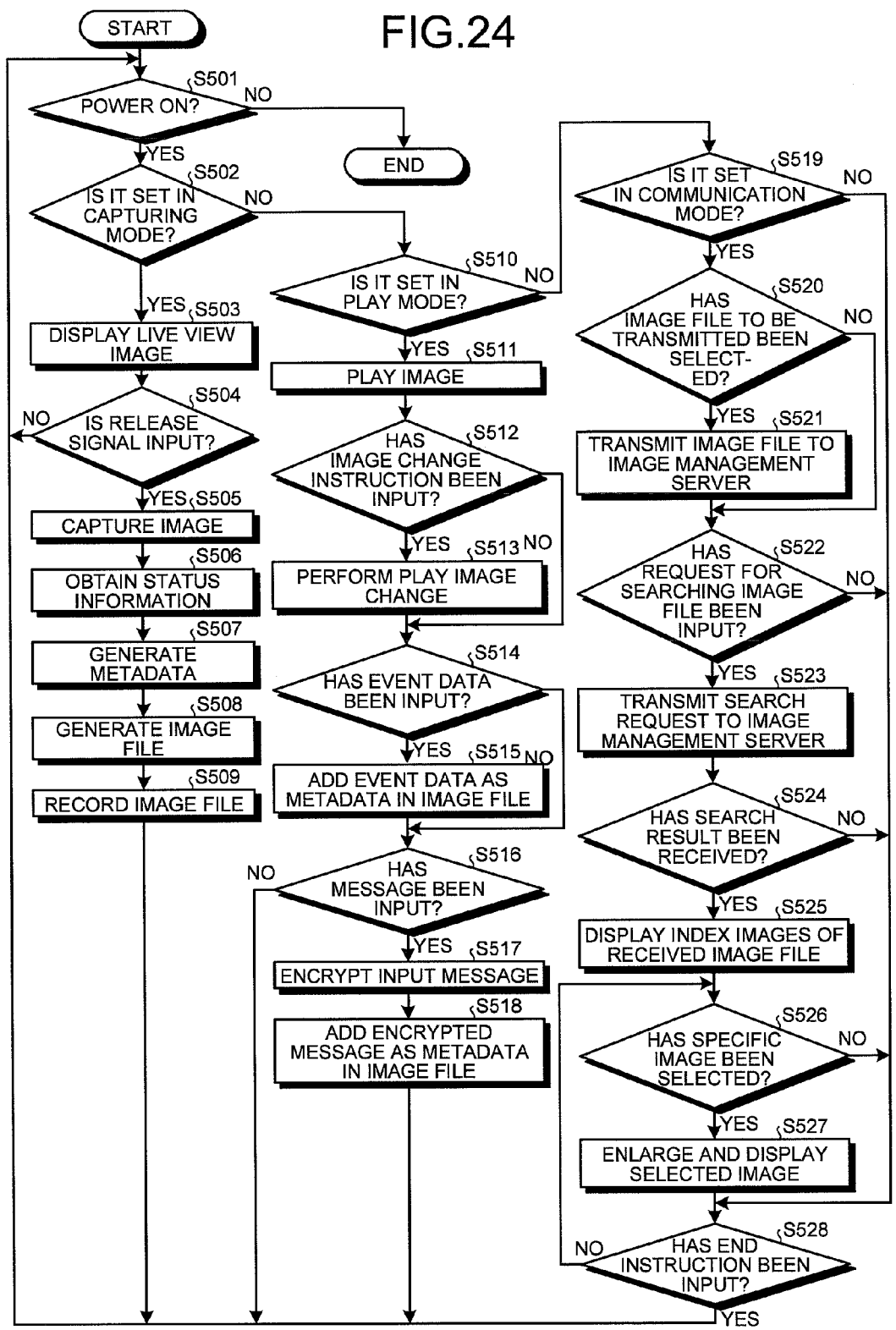
FIG. 24 is a flow chart illustrating a process content of an imaging device according to the third embodiment of the present invention.

Hereinafter, the process described with reference to FIG. 23 will be described in more detail. FIG. 24 is a flow chart illustrating a more detailed process content of the imaging device 7. In FIG. 24, in a case where the power supply of the imaging device 7 is in an ON state (Yes in step S501), when the imaging device 7 is set in a capturing mode (Yes in step S502), the control unit 78 displays a live view image on the display unit 75 (step S503). Further, in a case where the power supply of the imaging device 7 is not in the ON state (No in step S501), the imaging device 7 ends a series of processes.

Next, if a release signal is input from the operation input unit 73 (Yes in step S504), the imaging unit 71 performs a capturing operation under control of the control unit 78 (step S505). Then, the control unit 78 obtains status information of the imaging device 7, which the status detecting unit 74 has detected during the capturing operation, from the status detecting unit 74 (step S506).

Subsequently, the metadata generating unit 782 generates metadata on the basis of the obtained status information (step S507). Of the generated metadata, reference server address information is set in advance. In contrast, metadata such as temperature information and direction data is generated on the basis of the detection result of the status detecting unit 74.

Next, the image file generating unit 783 generates an image file on the basis of image data having been acquired by the imaging unit 71 and the metadata having been generated by the metadata generating unit 782 (step S508), and records the generated image file in the image file storing unit 761 (step S509). Then, the imaging device 7 returns to step S501.

Next, a case where the imaging device 7 is set in a play mode (No in step S502 and Yes step S510) will be described. In this case, the control unit 78 reads a predetermined image from the storing unit 76 and displays the image on the display unit 75 (step S511). Here, an image first displayed is, for example, the latest image. Next, in a case where a change instruction signal to instruction an image change is input by the operation input unit 73 (Yes in step S512), the control unit 78 reads a specified different image from the storing unit 76 and displays the image on the display unit 75 (step S513). In a case where a change instruction signal is not input (No in step S512), the imaging device 7 proceeds to step S514 to be described below.

Next, in a case where event data is input by the operation input unit 73 (Yes in step S514), the event data is additionally recorded as metadata in the image file (step S515). In a case where event data is not input in step S514 (No in step S514), the imaging device 7 proceeds to step S516.

Further, in a case where a message is input (Yes in step S516), the metadata generating unit 782 reads the encryption key from the encryption key storing unit 762 and encrypts the message by using the read encryption key (step S517). Then, the metadata generating unit 782 additionally records the encrypted message as encrypted metadata in the image file (step S518). If a message is not input in step S516 (No in step S516), the imaging device 7 returns to step S501.

Next, a case where the imaging device 7 is set in a communication mode (No in step S502, No in step S510, and Yes in step S519) will be described. In this case, when selection of an image file to be transmitted is performed by the operation input unit 73 (Yes in step S520), the selected image file is transmitted to the image management server 8 (step S521). Meanwhile, in a case where selection of an image file to be transmitted is not performed in step S520 (No in step S520), the imaging device 7 proceeds to step S522 to be described below.

Next, when a request for searching for an image file is input (Yes in step S522), the imaging device 7 transmits the search request to the image management server 8 (step S523). Then, in a case of receiving a search result from the image management server 8 (Yes in step S524), the imaging device 7 displays index images relative to the received image file on the display unit 75 (step S525).

Subsequently, in a case where a specific image of the index images is selected by the operation input unit 73 (Yes in step S526), the imaging device 7 enlarges and displays the selected specific image on the display unit 75 (step S527).

Next, in a case where a communication-mode end instruction is input by the operation input unit 73 (Yes in step S528), the imaging device 7 returns to step S501. Meanwhile, in a case where a communication-mode end instruction is not input by the operation input unit 73 (No in step S528), the imaging device 7 returns to step S526.

In a case where the imaging device is not set in the communication mode in step S519 (No in step S519), the imaging device 7 proceeds to step S528.

Figure 25:
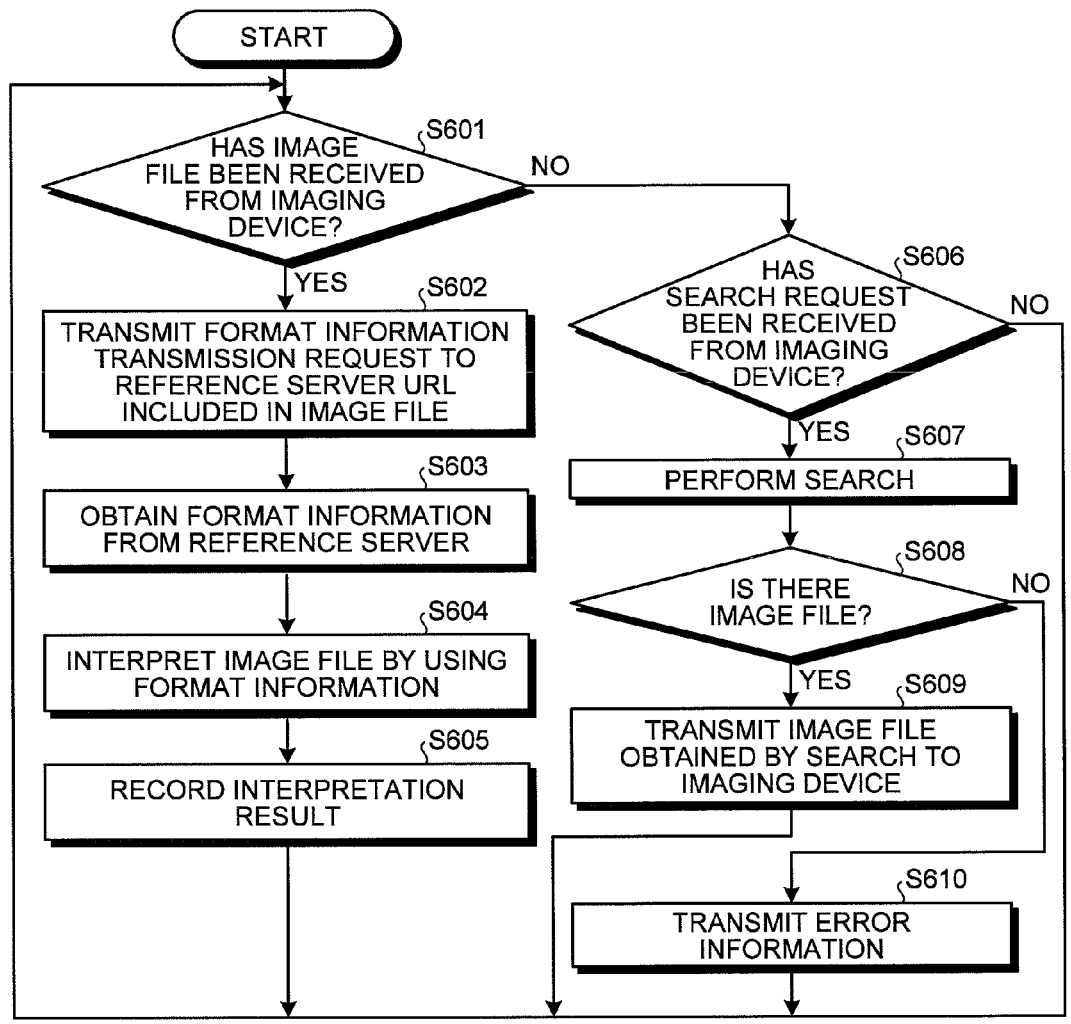
FIG. 25 is a flow chart illustrating a process content of an image management server.

FIG. 25 is a flow chart illustrating a more detailed process content of the image management server 8. In FIG. 25, in a case where the image management server 8 receives an image file from the imaging device 7 (Yes in step S601), on the basis of reference server address information F421 included in interpretation subject information F42 of the image file, the control unit 83 transmits a format information transmission request to a reference server 9-$j$ having the reference server address information (step S602).

Next, if format information is received from the reference server 9-$j$ to which the format information transmission request has been transmitted (step S603), the interpreting unit 831 interprets metadata groups of the image file on the basis of the received format information (step S604). Then, the interpreting unit 831 records the content of the interpreted metadata in the format information storing unit 822 (step S605). Next, the image management server 8 returns to step S601. Further, when interpreting an encrypted metadata group, the interpreting unit 831 performs decryption by an encryption key stored in the encryption key storing unit 823 and performs interpretation.

Next, a case where an image file is not received from the imaging device 7 (No in step S601) will be described. In this case, when a search request is received from the imaging device 7 (Yes in step S606), the searching unit 833 searches for the corresponding image file (step S607).

As the search result of the searching unit 833, in a case where there is a corresponding image file (Yes in step S608), the image management server 8 transmits the searched image file to the imaging device 7 (step S609). Meanwhile, as the search result of the searching unit 833, in a case where there is no corresponding image file (No in step S608), the image management server 8 transmits error information to the imaging device 7 (step S610).

According to the third embodiment described above, similar to the first embodiment, it is possible to implement flexible management which does not depend on a format of metadata included in an image file.

Further, according to the third embodiment of the present invention, even though a manufacturer arranges metadata according to a unique format and records the metadata in an image file, it is possible to recognize the newly set metadata by general-purpose image search software and effectively use the metadata. As a result, as for the manufacturer, restrictions when generating image files can be reduced, and users can perform image file search and the like without an awareness of differences between the manufacturers.

Furthermore, although the case where the imaging device 7 performs image file search has been described above, the user device 2 according to the first embodiment may be connected to the network N such that the user device 2 can be used to perform image file search. In this case, the user device 2 also needs to have an encryption key.

Fourth Embodiment

Figure 26:
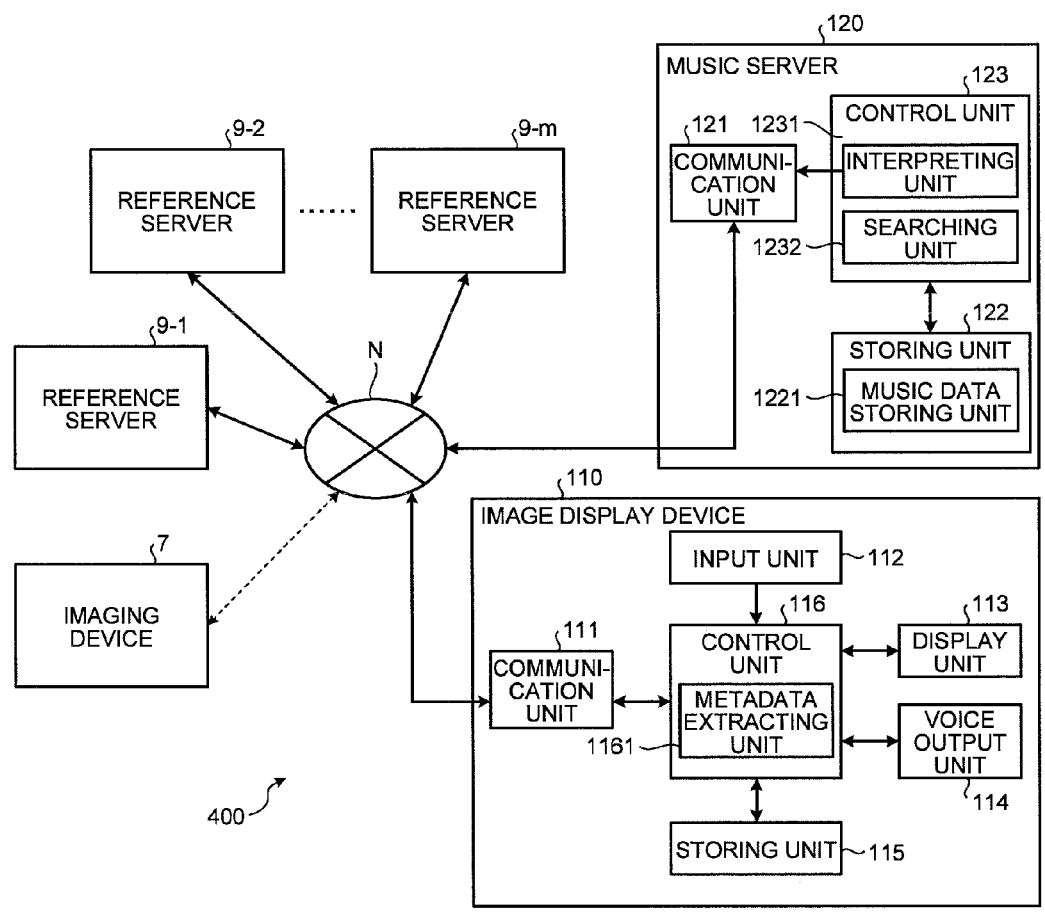
FIG. 26 is a view illustrating a configuration of an image communication system according to a fourth embodiment of the present invention.

FIG. 26 is a view illustrating a configuration of an image communication system according to a fourth embodiment of the present invention. An image communication system 400 illustrated in FIG. 26 includes an imaging device 7 that acquires an image and generates electronic image data, a plurality of reference servers 9-1, 9-2, . . . , and 9-$m$, an image display device 110 that displays the image, and a music server 120 that manages music data. The imaging device 7, the plurality of reference servers 9-1, 9-2, . . . , and 9-$m$, the image display device 110, and the music server 120 are connected to one another through a network N to be capable of communication.

The image display device 110 includes a communication unit 111 which is a communication interface for performing communication with the imaging device 7, the plurality of reference servers 9-1, 9-2, . . . , and 9-$m$, and the music server 120 through the network N, an input unit 112 to which various information is input, a display unit 113 that displays information including the image, a voice output unit 114 that outputs voice, a storing unit 115 that stores various information, and a control unit 116 that performs operation control of the image display device 110. The control unit 116 includes a metadata extracting unit 1161 that extracts metadata included in an image file transmitted from the imaging device 7.

The image display device 110 having the above-mentioned configuration is implemented by a digital photo frame, a television having a communication function, a personal computer, or the like.

The music server 120 includes a communication unit 121 which is a communication interface for performing communication with the imaging device 7, the plurality of reference servers 9-1, 9-2, . . . , and 9-$m$, and the image display device 110 through the network N, a storing unit 122 that stores various information, and a control unit 123 that performs operation control of the music server 120.

The storing unit 122 includes a music data storing unit 1221 that stores music data including data of a plurality pieces of music.

The control unit 123 includes an interpreting unit 1231 that interprets interpretation subject information (first interpretation subject information) included in metadata transmitted from the image display device 110, and a searching unit 1232 that performs music data search according to a metadata interpretation result of the interpreting unit 1231.

The interpretation subject information according to the fourth embodiment is different in quality from the interpretation subject information according to the first to third embodiments. However, the fourth embodiment has in common with the first and second embodiments the technological concept in which the image display device corresponding to the imaging device according to the first to third embodiments generates metadata including interpretation subject information and transmits the metadata to a server that can interpret the interpretation subject information included in the metadata among a plurality of servers (reference servers) connected to the imaging device through a network.

Figure 27:
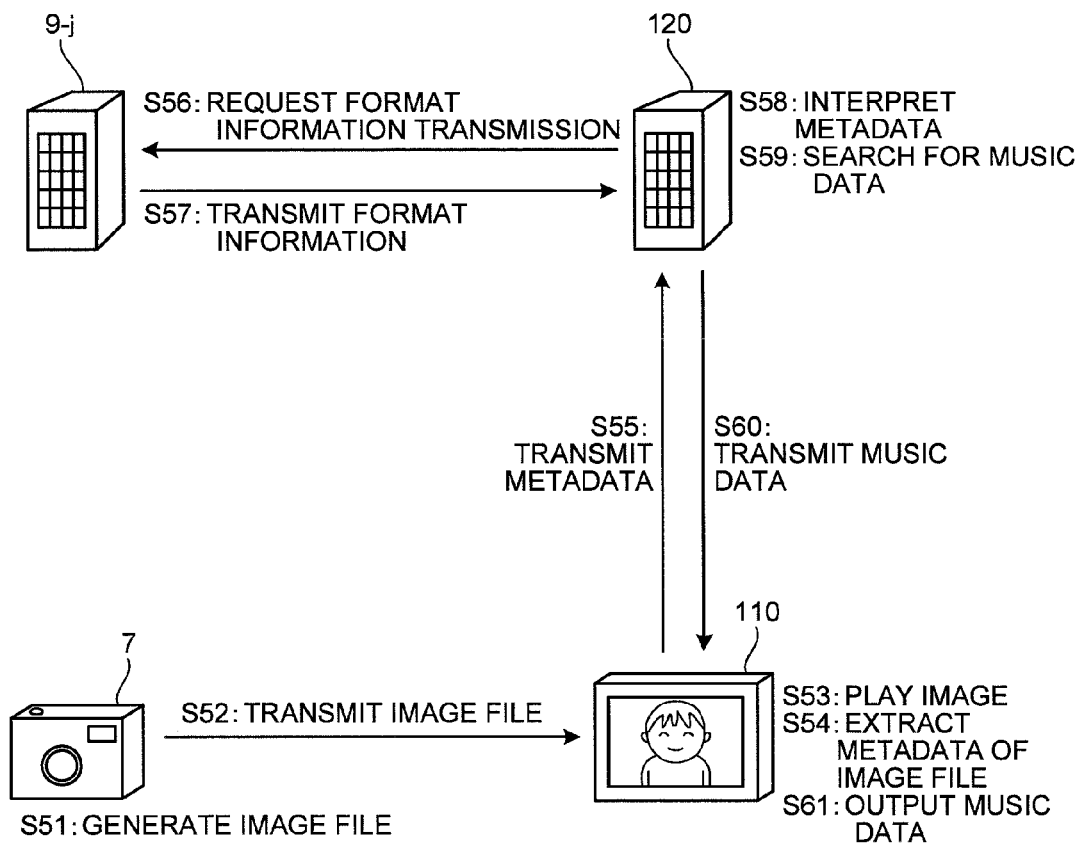
FIG. 27 is a view illustrating an overview of a process of the image communication system according to the fourth embodiment of the present invention.

FIG. 27 is a view illustrating an overview of a process of the image communication system 400. The imaging device 7 generates an image file on the basis of an acquired image (step S51). The generated image file is transmitted to the image display device 110 (step S52).

The image display device 110 receiving the image file from the imaging device 7 plays image data included in the received image file (step S53), and at the same time, the metadata extracting unit 1161 extracts metadata of the image file (step S54). Then, on the basis of music server address information included in the metadata, the image display device 110 transmits the metadata to the music server 120 having an URL recorded in the address information (step S55).

On the basis of reference server address information (second interpretation subject information) included in the metadata, the music server 120 that has received the metadata from the image display device 110 transmits a format information transmission request to a reference server 9-*j* having an URL recorded in the reference server address information (step S56).

The reference server 9-*j* that has received the format information transmission request transmits format information stored in the storing unit 92-*j* (step S57). The interpreting unit 1231 of the music server 120 that receives the format information from the reference server 9-*j* interprets the metadata on the basis of the format information (step S58), and searches music data stored in the music data storing unit 1221 on the basis of the interpretation result (step S59). Here, for example, information on the kind of music, a composer, a musical performer, and the like, may be recorded in the metadata such that music matching those criteria can be selected.

Next, the music server 120 transmits music data, which has been extracted from the music data storing unit 1221 as the search result, to the image display device 110 (step S60). Here, since the data mount of music data is large, even in a case of searching for a plurality of pieces of music, data on one piece of music is transmitted. At this time, as a selection criterion, for example, it can be set to select music data having the smallest data amount.

The image display device 110 that has received the music data from the music server 120 outputs the music data from the voice output unit 114 (step S61).

As described above, the image display device 110 can output music matching an image on the basis of metadata included in the image.

Figure 28:
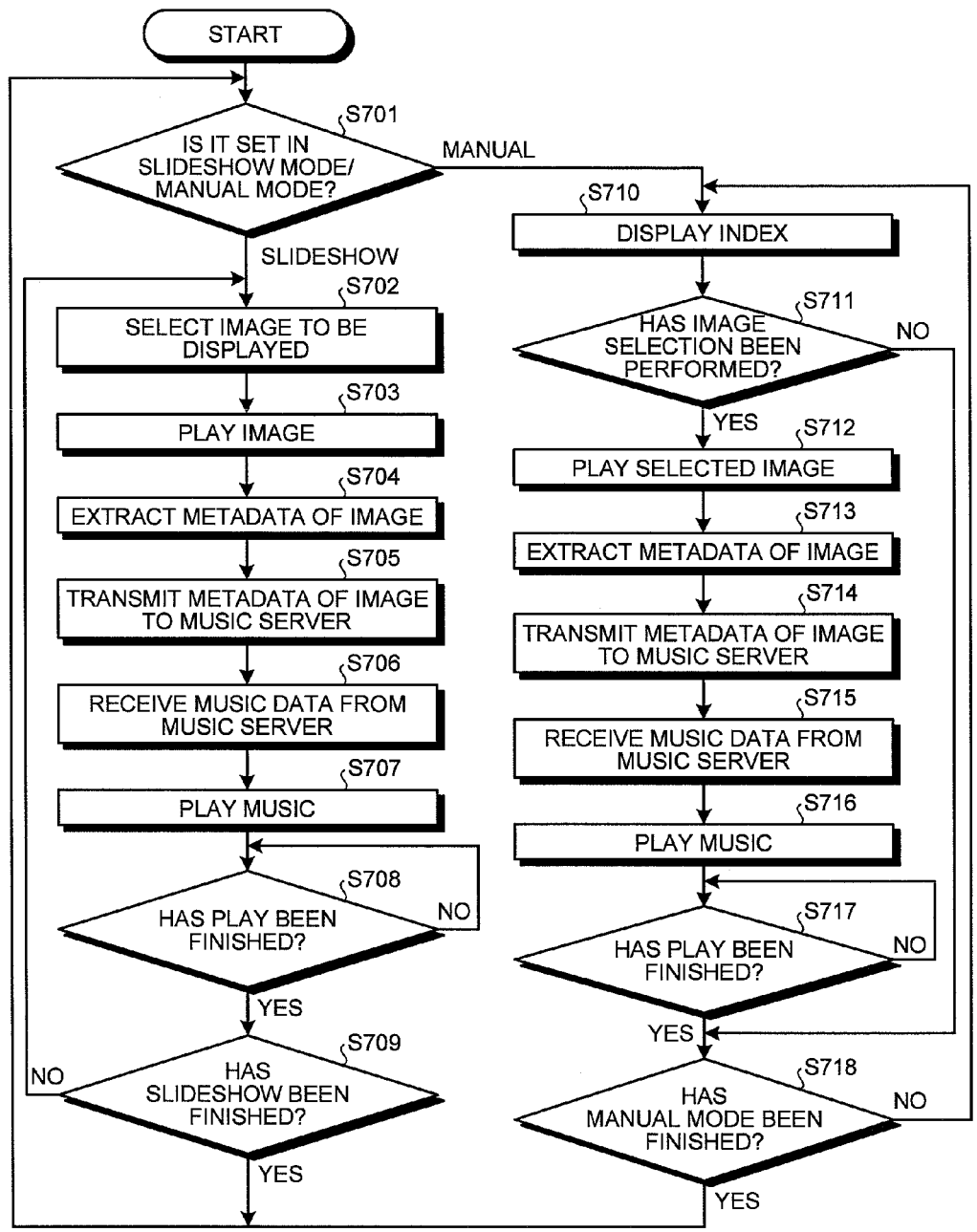
FIG. 28 is a flow chart illustrating a process content when an image display device plays an image.

FIG. 28 is a flow chart illustrating a process content when the image display device 110 plays an image. First, a case where the image display device 110 is set in a slideshow mode (Slideshow in step S701) will be described. In this case, the image display device 110 selects an image to be displayed (step S702), and displays the selected image on the display unit 113 (step S703). Subsequently, the metadata extracting unit 1161 extracts metadata of an image file corresponding to the played image (step S704), and transmits the extracted metadata to the music server 120 (step S705).

Subsequently, the image display device 110 receives music data from the music server 120 (step S706), and plays music included in the received music data (step S707). Next, in a case where the music play has been finished (Yes in step S708), when a slideshow end instruction is not input from the input unit 112 (No in step S709), the image display device 110 returns to step S702 and selects another image. Meanwhile, in a case where the music play has been finished (Yes in step S708), when a slideshow end instruction is input from the input unit 112 (Yes in step S709), the image display device 110 returns to step S701.

If the play has not been finished (No in step S708), the image display device 110 repeats step S708.

Next, a case where the image display device 110 is set in a manual mode (Manual in step S701) will be described. In this case, first, index display is performed on the display unit 113 (step S710). Next, in a case where an image to be displayed is selected through the input unit 112 (Yes in step S711), the display unit 113 plays and displays the selected image (step S712).

Subsequently, the metadata extracting unit 1161 extracts metadata of an image file corresponding to the played and displayed image (step S713), and transmits the extracted metadata to the music server 120 (step S714). Then, the image display device 110 receives music data from the music server 120 (step S715), and plays music included in the received music data (step S716). Next, in a case where the music play has been finished (Yes in step S717), when a manual-mode end instruction is not input from the input unit 112 (No in step S718), the image display device 110 returns to step S710. Meanwhile, in a case where the music play has been finished (Yes in step S717), when a manual-mode end instruction is input from the input unit 112 (Yes in step S718), the image display device 110 returns to step S701.

FIG. 29 is a flow chart illustrating a more detailed process content of the music server 120. In FIG. 29, in a case where the music server 120 receives metadata from the image display device 110 (Yes in step S801), the control unit 123 transmits a format information transmission request to a reference server 9-*j* having reference server address information included in the metadata (step S802).

Next, if the music server 120 receives format information from the reference server 9-*j* (step S803), the interpreting unit 1231 interprets the metadata on the basis of the received format information (step S804). Subsequently, the searching unit 1232 searches for music data on the basis of the metadata interpreted by the interpreting unit 1231 (step S805), and transmits music data selected by the searching to the image display device 110 (step S806). Next, the music server 120 returns to step S801.

According to the fourth embodiment of the present invention described above, similar to the first embodiment, it is possible to implement flexible management which does not depend on a format of metadata included in an image file.

Further, according to the fourth embodiment, even though a manufacturer arranges metadata according to a unique format and records the metadata in an image file, it is possible to recognize the newly set metadata by general-purpose image search software and effectively use the metadata.

In addition, according to the fourth embodiment, it is possible to provide an entertaining service by combining music data with image data.

In the above explanation, the imaging device directly accesses the respective servers. However, the imaging device may be connected to a user device to access the respective servers through the user device. In this case, the communication unit of the imaging device includes a transmission control unit that transmits the image file to a server having address information.

The imaging device according to the present invention may include an imaging unit that captures an image of a subject to generate electronic image data, an image file generating unit that generates an image file including first interpretation subject information which is interpreted by any one of a plurality of servers connected to each other through a network and second interpretation subject information which includes address information for access to any one of the plurality of servers through the network, and an access control unit that transmits the image file to the server with the address on the basis of the second interpretation subject information. The access control unit can control the direct access of the imaging device to a server and an access of the imaging device to a server through another terminal.

In the present invention, an imaging system may be configured in which a part of the image file generating unit is included in a terminal such as a personal computer or a specific server as destination and the part of the image file generating unit is connected to an imaging device including an imaging unit. In this imaging system, if the imaging device has a transmission function using a network, the second interpretation subject information of the image file generating unit is to be referred when the imaging device accesses the transmission destination.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image communication system comprising:

an imaging device that images a subject to generate electronic image data; and a plurality of servers capable of communicating with the imaging device through a network, wherein the imaging device includes an imaging unit that images a subject to generate electronic image data, an image file generating unit that generates an image file including first interpretation subject information interpreted by any one of the plurality of servers, the first interpretation subject information including at least one of the generated image data and a plurality of pieces of metadata associated with the image data and being interpreted by any one of a plurality of servers connected to each other through a network, and second interpretation subject information, the second interpretation subject information being different from the first interpretation subject information and including address information that has a Uniform Resource Locator (URL) of a server capable of interpreting the first interpretation subject information in the network, and a communication unit that transmits the image file to the server with the address information based on the second interpretation subject information and receives the address information from a server capable of interpreting the first interpretation subject information, and wherein each of the servers includes an interpreting unit that interprets the first interpretation subject information included in the image file transmitted by the imaging device, a second communication unit that transmits a transmission request for format information for defining a format of the metadata to a server corresponding to the address information when the interpreting unit cannot interpret the first interpretation subject information, and receives the format information from at least one of the plurality of servers responding to the transmission request, and a database generating unit that generates a database of the first interpretation subject information interpreted based on the format information received by the second communication unit.

2. The image communication system according to claim 1, further comprising a storing unit that stores an encryption key for encrypting information, wherein the first interpretation subject information includes information encrypted with the encryption key.

3. The image communication system according to claim 2, wherein the encrypted information includes information of the subject included in the image data.

4. The image communication system according to claim 1, further comprising a display unit that displays information including the image data generated by the imaging unit, the information being generated by a server capable of interpreting the first interpretation subject information.

5. The image communication system according to claim 1, further comprising a searching unit that searches for the image file stored in a storing unit by using the first interpretation subject information interpreted by the interpreting unit.

* * * * *